(12) United States Patent
Nakada et al.

(10) Patent No.: US 11,735,906 B2
(45) Date of Patent: Aug. 22, 2023

(54) POWER CONVERTER AND BREAKING MECHANISM

(71) Applicant: Mitsubishi Electric Corporation, Tokyo (JP)

(72) Inventors: Katsushi Nakada, Tokyo (JP); Kenta Fujii, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/850,496

(22) Filed: Jun. 27, 2022

(65) Prior Publication Data
US 2023/0006438 A1 Jan. 5, 2023

(30) Foreign Application Priority Data
Jul. 5, 2021 (JP) .............................. JP2021-111231

(51) Int. Cl.
*H02H 7/12* (2006.01)
*H02M 3/00* (2006.01)
*H02M 3/335* (2006.01)

(52) U.S. Cl.
CPC .......... *H02H 7/1213* (2013.01); *H02M 3/003* (2021.05); *H02M 3/335* (2013.01)

(58) Field of Classification Search
CPC ..... H02H 7/1213; H02M 3/003; H02M 3/335
See application file for complete search history.

(56) References Cited

U.S. PATENT DOCUMENTS

| 11,437,987 B2* | 9/2022 | KÖLlensperger ..... H02H 3/023 |
| 2012/0013431 A1* | 1/2012 | Blattler ................ H05K 1/0293 |
| | | 337/297 |
| 2016/0072401 A1* | 3/2016 | Onishi .............. H01L 23/49562 |
| | | 363/55 |

FOREIGN PATENT DOCUMENTS

JP 2000-003662 A 1/2000

* cited by examiner

*Primary Examiner* — Jue Zhang
(74) *Attorney, Agent, or Firm* — Sughrue Mion, PLLC; Richard C. Turner

(57) ABSTRACT

To provide a power converter and a breaking mechanism which can break a DC current and can suppress that a fused material scatter to other circuits at fusing, in the case where the breaking mechanism of excess current is formed by a circuit pattern of a circuit board. In a power converter, a supporting member is provided with a support body part; a fixation projection part which projected from the support body part and to which the multilayer circuit board was fixed; and a support projection part which projected from the support body part and supports an one side circuit board face, wherein the fuse pattern is provided in an inner layer, and the support projection part overlaps with at least one part of a fusing part of the fuse pattern, viewing in a normal direction of the circuit board face of the multilayer circuit board.

22 Claims, 14 Drawing Sheets

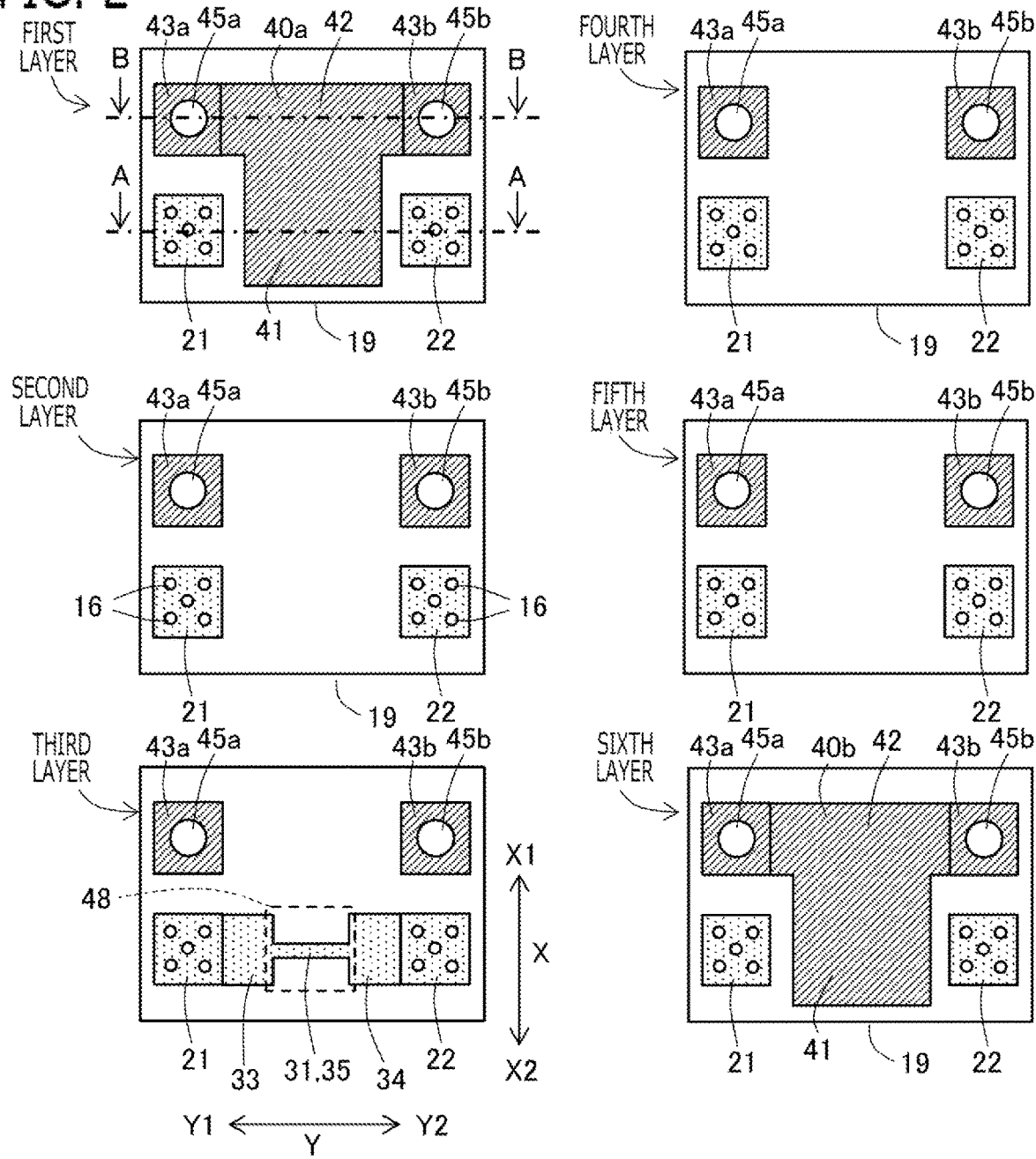

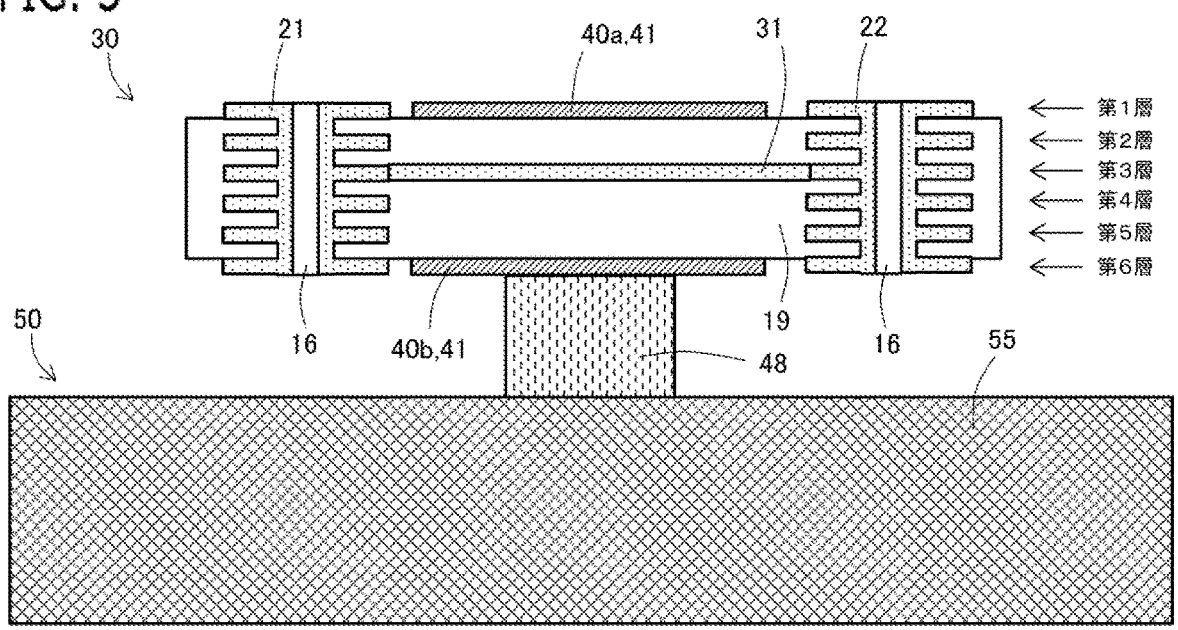
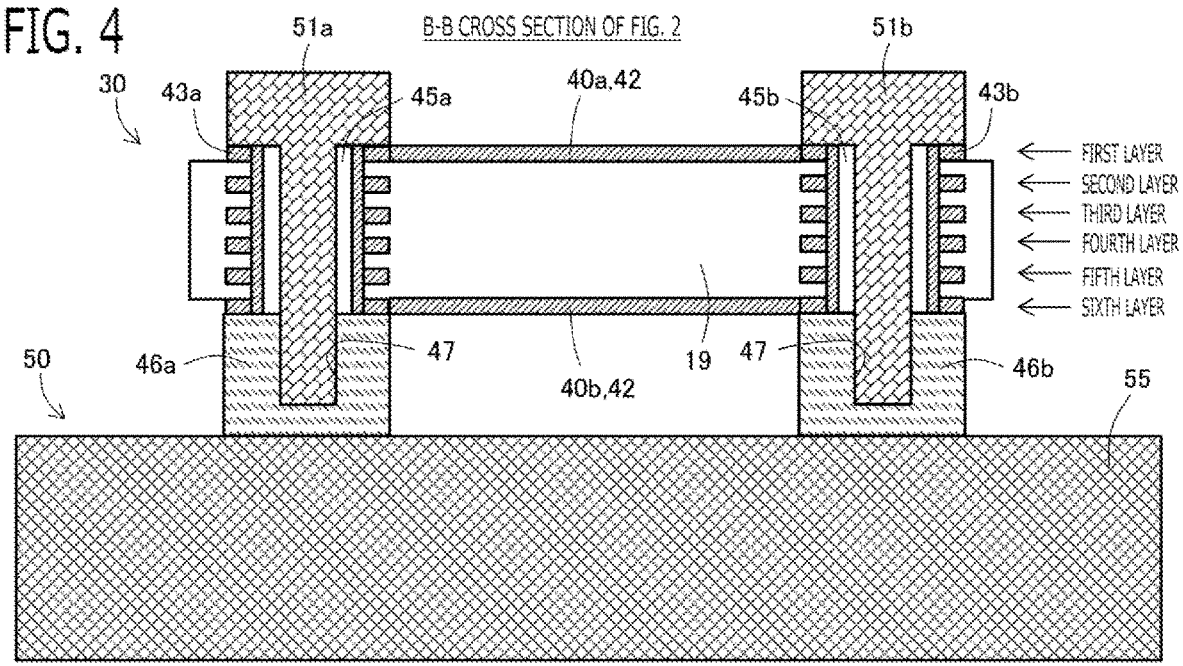

A-A CROSS SECTION OF FIG. 2

← FIRST LAYER
← SECOND LAYER
← THIRD LAYER
← FOURTH LAYER
← FIFTH LAYER
← SIXTH LAYER

FIG. 12  A-A CROSS SECTION OF FIG. 11
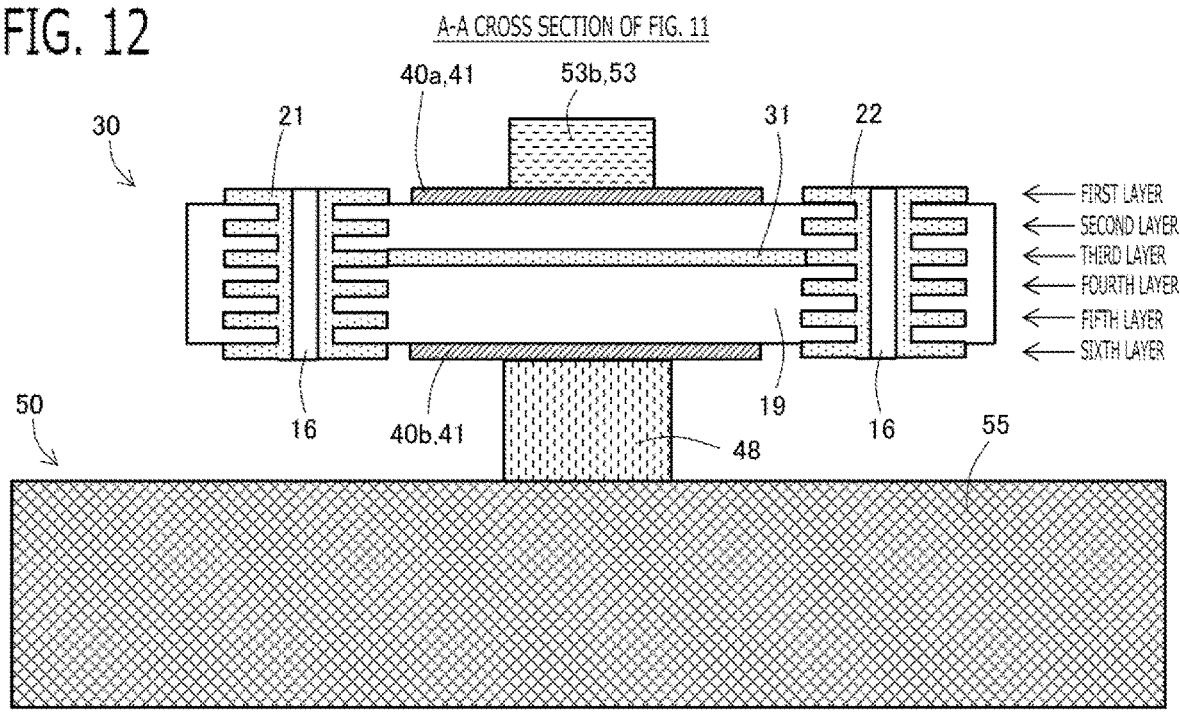
FIG. 13  B-B CROSS SECTION OF FIG. 11
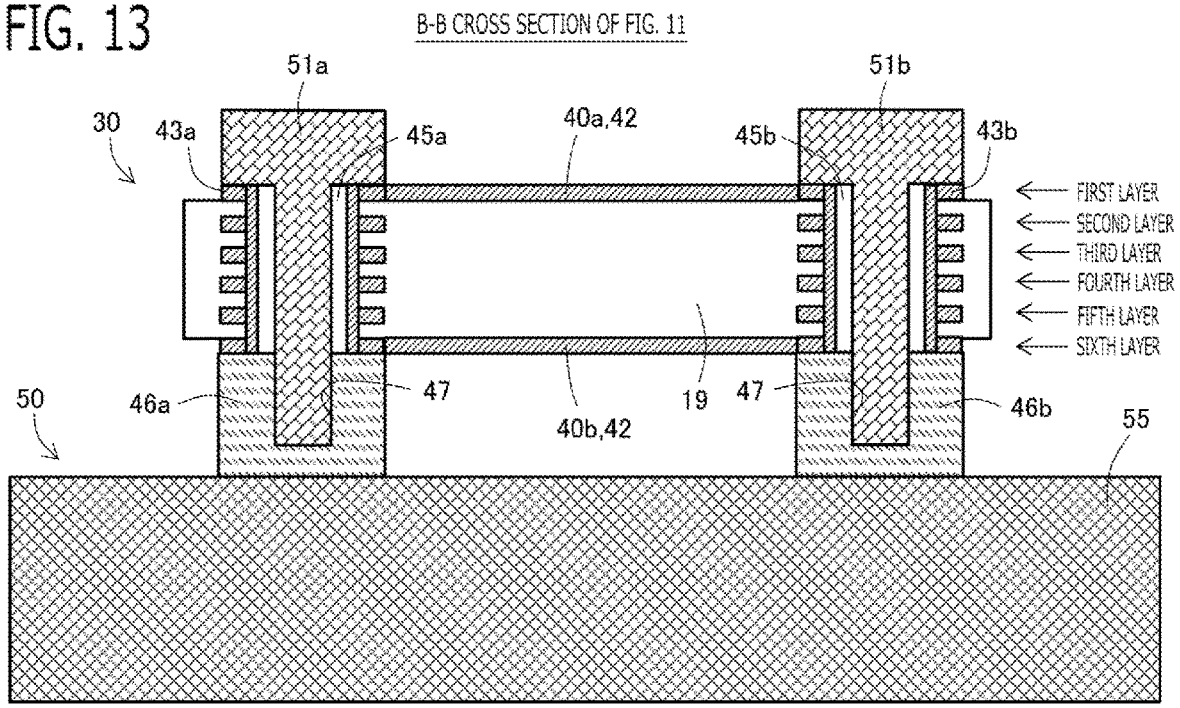

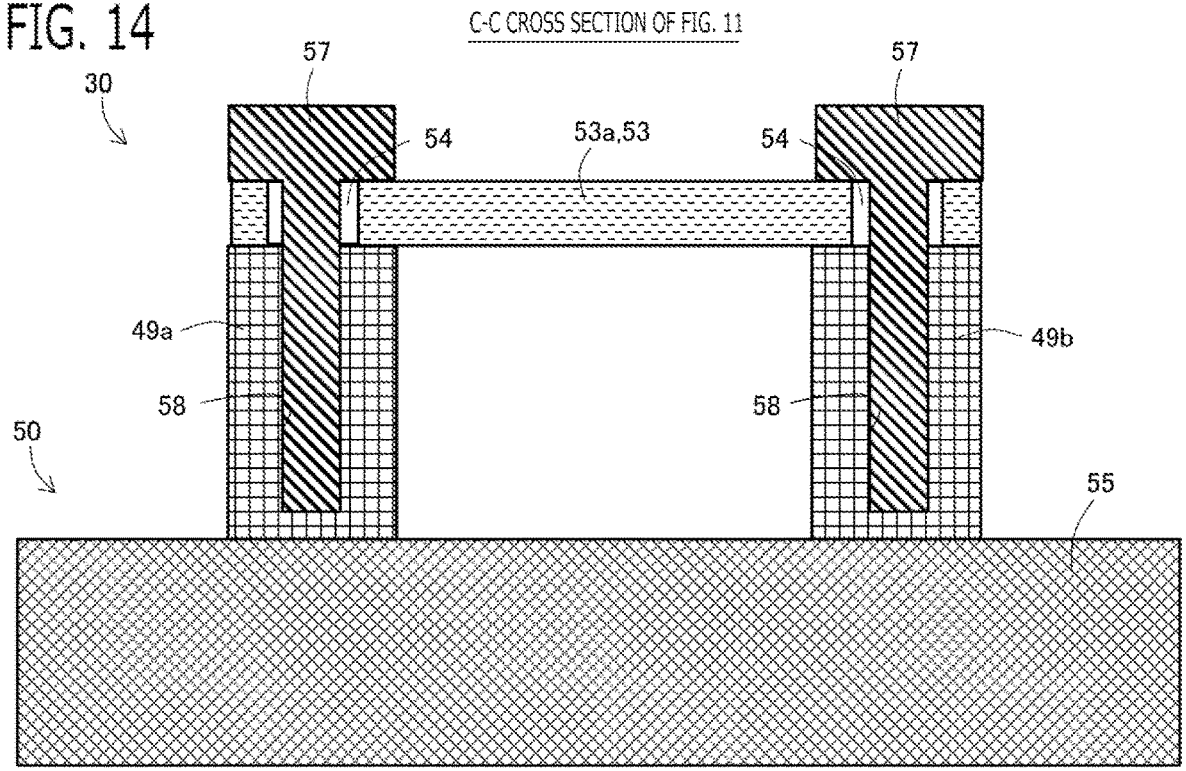
FIG. 14  C-C CROSS SECTION OF FIG. 11
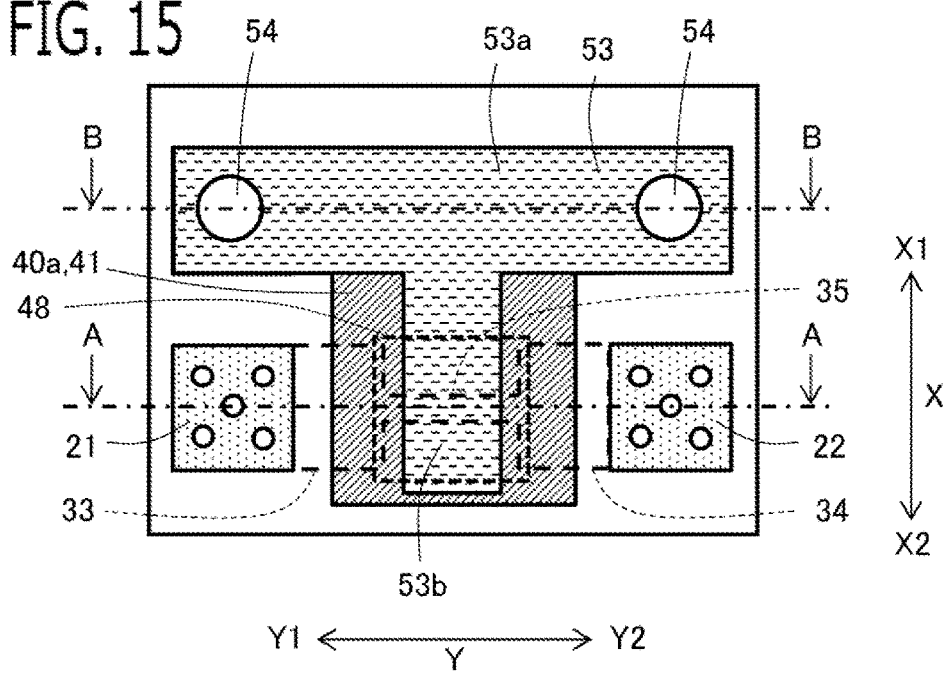
FIG. 15

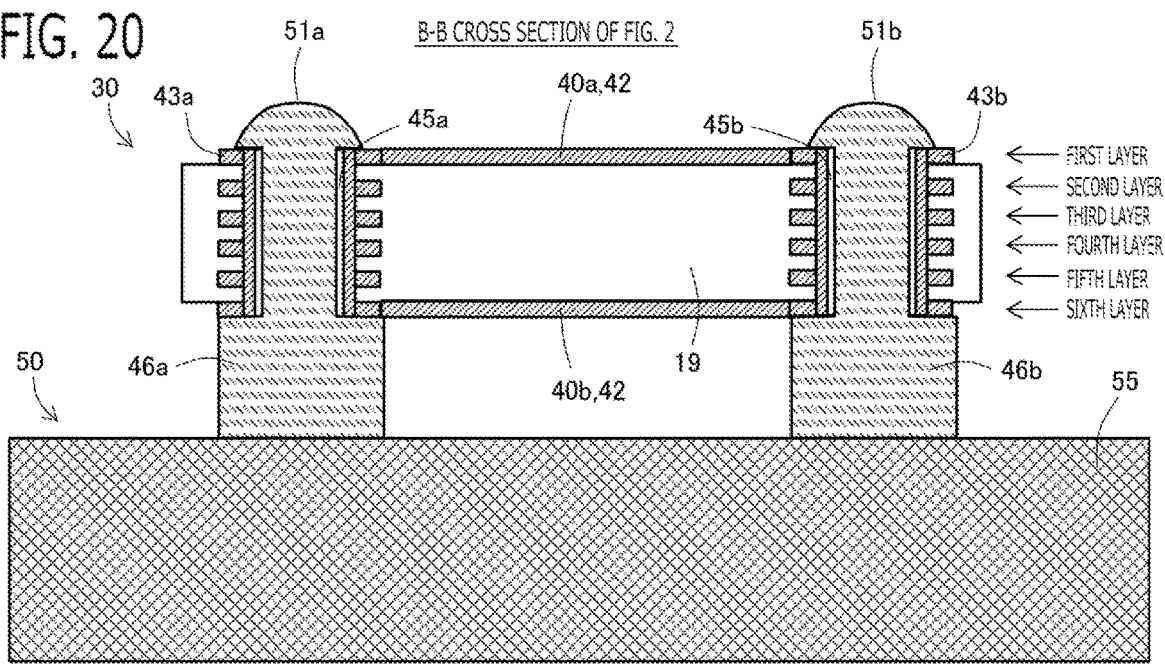
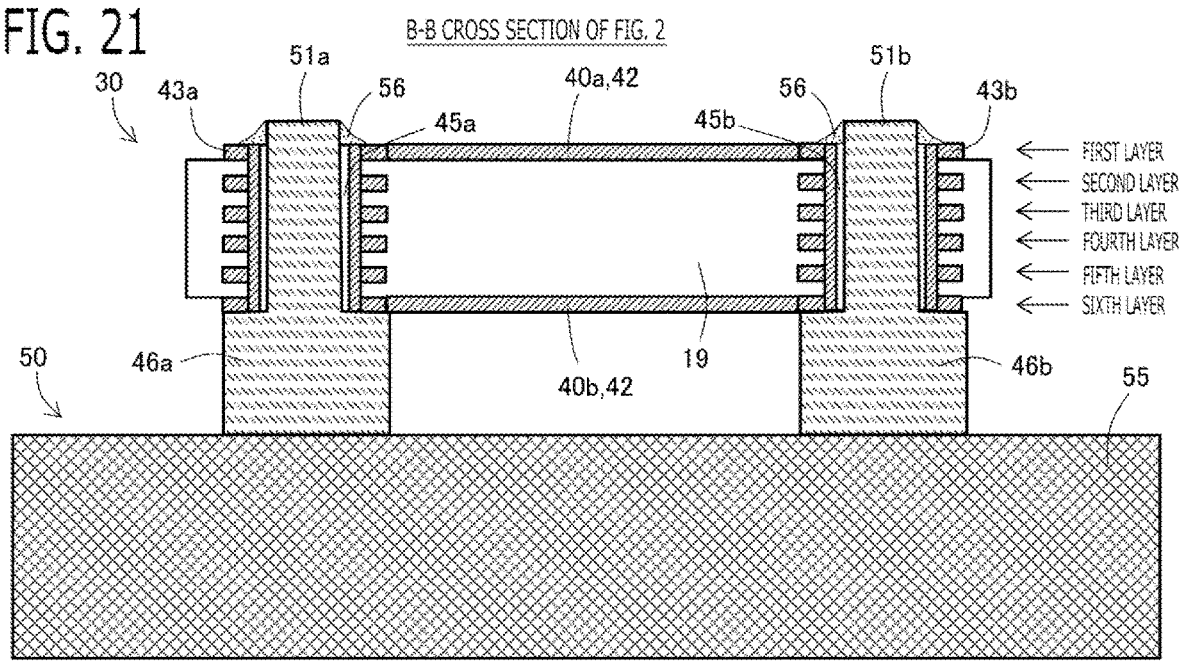

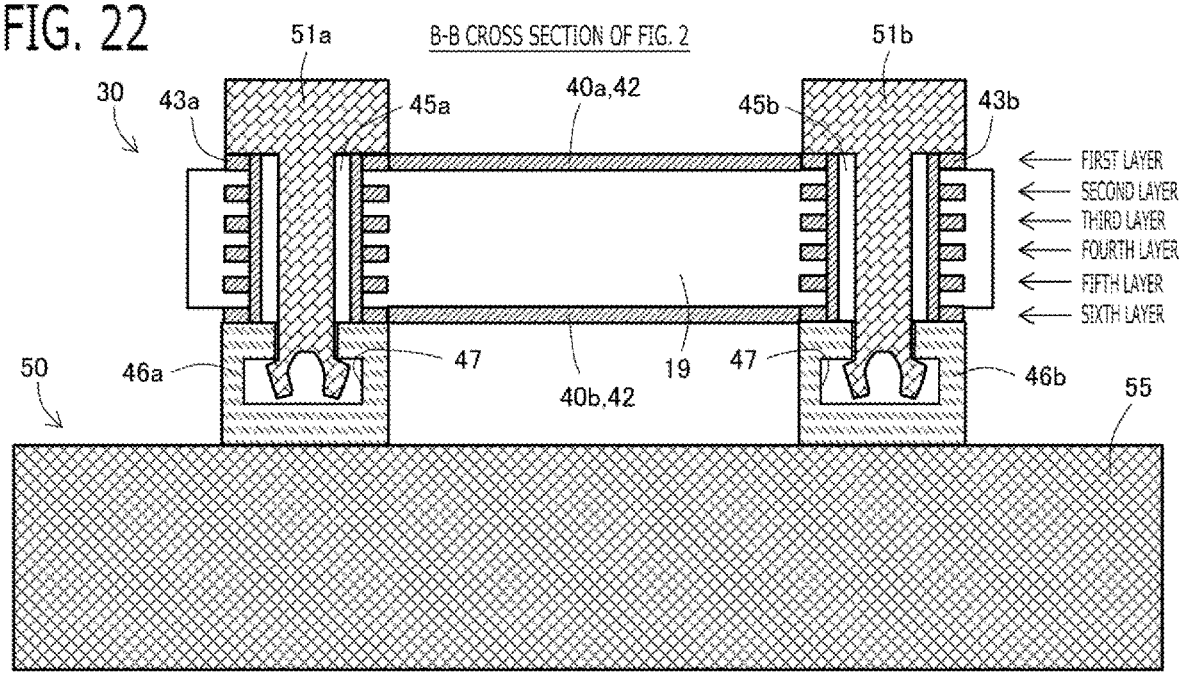

POWER CONVERTER AND BREAKING MECHANISM

INCORPORATION BY REFERENCE

The disclosure of Japanese Patent Application No. 2021-111231 filed on Jul. 5, 2021 including its specification, claims and drawings, is incorporated herein by reference in its entirety.

BACKGROUND

The present disclosure relates to a power converter and a breaking mechanism.

In a power converter, in the power supplying state of battery, when an electronic component, such as a power semiconductor device, or a capacitor forming a snubber circuit, is short-circuited, excessive current flows. If the excess current flows continuously, the power converter is damaged by energization of large current.

Then, previously, when excess current flows, damage of the electrical components is prevented by fusing a current fuse (a tube fuse), the tube fuse is installed in a part through which the short-circuit current of apparatus flows, and the tube fuse is fused by a larger current value than the rated current of apparatus.

Unlike the tube fuse, a part of circuit board pattern is formed by a wiring pattern thinner than others, this thin wiring pattern part is fused at the short circuit of an electrical component or a closed circuit, and current is broken (for example, JP 2000-3662A).

SUMMARY

However, the technology of JP 2000-3662 A targets the commercial power. Since the commercial power is AC current, the zero point of current exists. Accordingly, even if the arc discharge is generated after fusing of the thin wiring pattern part, when current becomes the zero point, the arc discharge disappears and current is broken. However, in the case of DC current, since the zero point of current does not exist, after fusing of the thin wiring pattern part, the arc discharge is continuously generated and the current continuously flows.

In the technology of JP 2000-3662 A, since the thin wiring pattern part is provided in the outer layer of the circuit board, the fused material scatters to other circuits at fusing, and there is a possibility of damaging the electrical component.

Then, in the case where the breaking mechanism of excess current is formed by a circuit pattern of a circuit board, the purpose of the present disclosure is to provide a power converter and a breaking mechanism which can break a DC current and can suppress that a fused material scatter to other circuits at fusing.

A power converter according to the present disclosure, including:
  a semiconductor element;
  a breaking mechanism that breaks current when excessive current flows; and
  a wiring member that connects the semiconductor element and the breaking mechanism,
    wherein the breaking mechanism is provided with
    a multilayer circuit board in which a plurality of conductive patterns including a fuse pattern which fuses when excessive current flows and a plurality of insulating members are laminated, and
    a support member which is provided with a support body part; a fixation projection part which projected from the support body part to the multilayer circuit board side and to which the multilayer circuit board was fixed; and a support projection part which projected from the support body part to the multilayer circuit board side and supports an one side circuit board face of the multilayer circuit board,
    wherein the fuse pattern is provided in an inner layer of the multilayer circuit board, and
    wherein the support projection part overlaps with at least one part of a fusing part of the fuse pattern, viewing in a normal direction of the circuit board face of the multilayer circuit board.

A breaking mechanism that breaks current when excessive current flows according to the present disclosure, the breaking mechanism including:
  a multilayer circuit board in which a plurality of conductive patterns including a fuse pattern which fuses when excessive current flows and a plurality of insulating members are laminated, and
  a supporting member which is provided with a support body part; a fixation projection part which projected from the support body part to the multilayer circuit board side and to which the multilayer circuit board was fixed; and a support projection part which projected from the support body part to the multilayer circuit board side and supports an one side circuit board face of the multilayer circuit board,
    wherein the fuse pattern is provided in an inner layer of the multilayer circuit board, and
    wherein the support projection part overlaps with at least one part of a fusing part of the fuse pattern, viewing in a normal direction of the circuit board face of the multilayer circuit board.

According to the power converter and the breaking mechanism of the present disclosure, the arc discharge may be generated after the fuse pattern fuses by excess current. The fuse pattern is disposed in the inner layer and is surrounded by the insulating member of the multilayer circuit board. Therefore, the arc discharge is limited in the space within the insulating member, and the cross-section area of the arc discharge does not become large. Decomposition gas is emitted from the insulating member by exposing the insulating member of the multilayer circuit board to the arc discharge. By the decomposition gas, the cross-section area of the arc discharge becomes smaller than the cross-section area of the space within the insulating member (the ablation effect). As a result, a resistance value of the arc discharge in inverse proportion to the cross-section area of the arc discharge becomes high, and the arc voltage becomes high. Therefore, the arc discharge current which is generated after fusing can be decreased gradually, and the DC current can be broken. Since the fuse pattern is provided in the inner layer, it can be suppressed that the fused material of the fuse pattern and the like scatter to other circuits.

Since high energy is generated inside the multilayer circuit board when the fuse pattern fuses, the fuse pattern and the insulating member exfoliate and the space where the fusing part is provided may be expanded. The cross-section area of the arc discharge becomes large, and the arc discharge cannot be broken. The part of the multilayer circuit board where the fusing part generating force at fusing was provided can be pressed also from the other side circuit board face side by the support projection part, and the multilayer circuit board can be suppressed effectively from exfoliating due to the force generated at fusing. And, since the fixation projection part and the support projection part are provided, the multilayer circuit board can be supported while spacing from the support body part, and it is easy to secure the insulation between the fuse pattern and the like and the support member at fusing and at un-fusing. The support projection part can support intensively the part of the multilayer circuit board where the fusing part was provided.

BRIEF DESCRIPTION OF THE DRAWINGS

FIG. 2 is a plan view of each layer of the multilayer circuit board according to Embodiment 1;

FIG. 3 is a cross-sectional view of the multilayer circuit board cut at the A-A cross section position of FIG. 2 according to Embodiment 1;

FIG. 4 is a cross-sectional view of the multilayer circuit board cut at the B-B cross section position of FIG. 2 according to Embodiment 1;

FIG. 12 is a cross-sectional view of the multilayer circuit board cut at the A-A cross section position of FIG. 11 according to Embodiment 4;

FIG. 13 is a cross-sectional view of the multilayer circuit board cut at the B-B cross section position of FIG. 11 according to Embodiment 4;

FIG. 14 is a cross-sectional view of the multilayer circuit board cut at the C-C cross section position of FIG. 11 according to Embodiment 4;

FIG. 15 is a plan views of the breaking mechanism according to Embodiment 5;

FIG. 20 is a cross-sectional view of the multilayer circuit board cut at the A-A cross section position of FIG. 2 according to other embodiments;

FIG. 21 is a cross-sectional view of the multilayer circuit board cut at the A-A cross section position of FIG. 2 according to other embodiments; and FIG. 22 is a cross-sectional view of the multilayer circuit board cut at the A-A cross section position of FIG. 2 according to other embodiments.

DETAILED DESCRIPTION OF THE EMBODIMENTS

1. Embodiment 1

Figure 1:
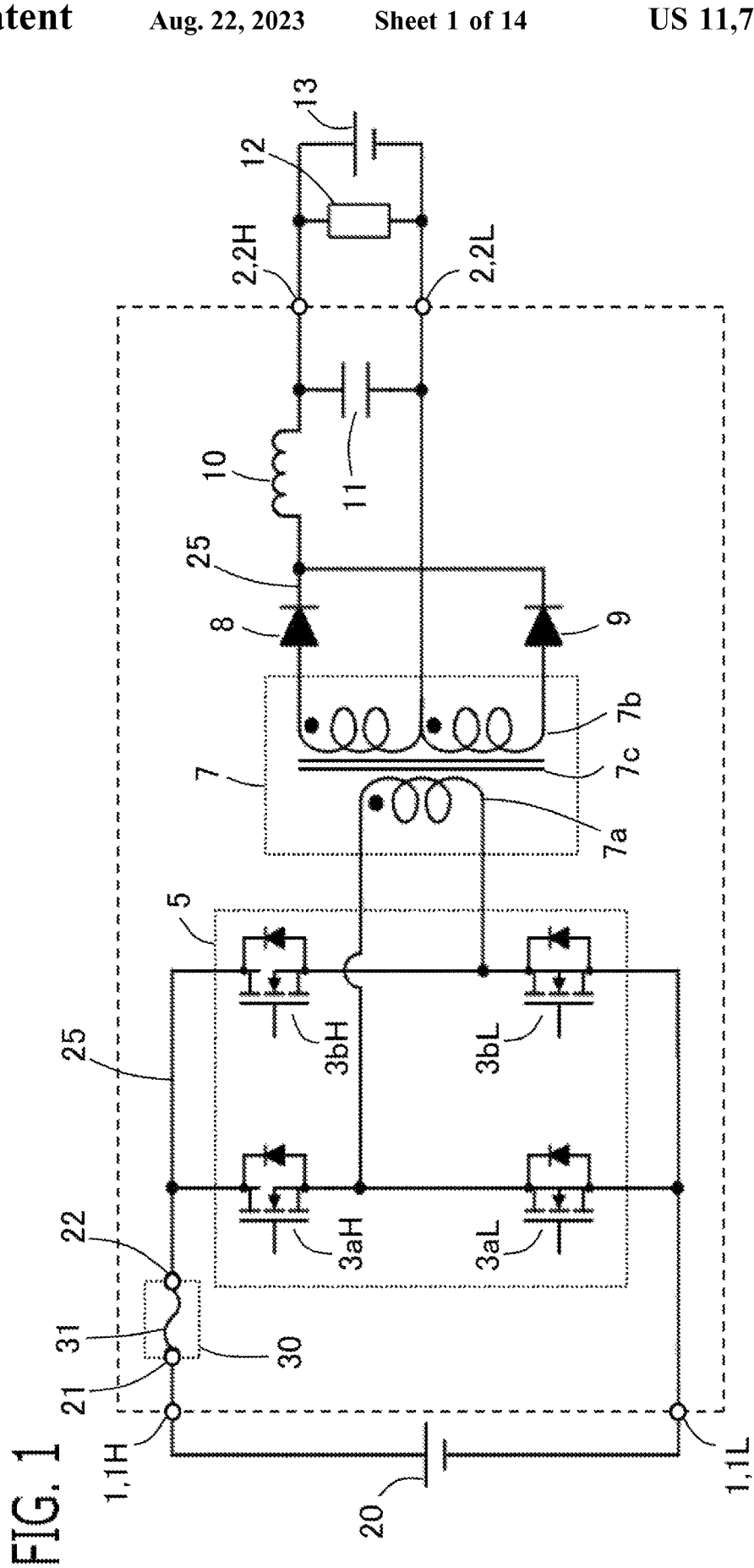
FIG. 1 is a schematic circuit diagram of the power converter according to Embodiment 1.

A power converter according to Embodiment 1 will be explained with reference to drawings. The power converter performs a power conversion between a first external connection terminal 1 and a second external connection terminal 2. The power converter is provided with a semiconductor element 3, a breaking mechanism 30 that breaks current when excessive current flows, and a wiring member 25 that connects the semiconductor element 3 and the breaking mechanism 30.

1-1. Basic Configuration of Power Converter

FIG. 1 is a circuit diagram of the power converter. The power converter performs power conversion between the first external connection terminal 1 and the second external connection terminal 2. In the present embodiment, the power converter is an insulated type DC-DC converter. A first side DC power source 20 (in this example, battery) is connected to the first external connection terminal 1. An electric load 12 and a second side DC power source 13 (in this example, battery) are connected to the second external connection terminal 2. A voltage Vin of the first external connection terminal 1 becomes higher than a voltage Vout of the second external connection terminal 2.

Between a high potential side terminal 1H and a low potential side terminal 1L of the first external connection terminal 1, a semiconductor circuit 5 configured by the semiconductor element 3 is connected via the wiring member 25. The semiconductor element 3 is a switching device 3. A diode may be used as the semiconductor element 3. The semiconductor circuit 5 is provided with a first series circuit in which a high potential side switching device 3aH and a low potential side switching device 3aL are connected in series, and a second series circuit in which a high potential side switching device 3bH and a low potential side switching device 3bL are connected in series. A connection node between the high potential side and the low potential side switching devices 3aH, 3aL of the first series circuit is connected to one terminal of a primary winding 7a of a transformer 7 via the wiring member 25. A connection node between the high potential side and the low potential other switching devices 3bH, 3bL of the second series circuit is connected to the other terminal of the primary winding 7a of the transformer 7 via the wiring member 25. The semiconductor circuit 5 is formed in a resin-sealed module shape.

A MOSFET (Metal Oxide Semiconductor Field Effect Transistor) is used as the switching device 3. Other kinds of switching device such as an IGBT (Insulated Gate Bipolar Transistor) in which a diode is connected in reversely parallel may be used as the switching device 3.

A gate terminal of the each switching device is connected to the controller (not illustrated). The controller drives on/off each switching device 3 by PWM control (Pulse Width Modulation), and makes the power converter perform power conversion.

The transformer 7 is provided with the primary winding 7a, a secondary winding 7b, and an iron core 7c in which the primary winding 7a and the secondary winding 7b are wound.

One end of the secondary winding 7b is connected to one end of a reactor 10 via a diode 8 for rectification, and the wiring member 25. The other end of the secondary winding 7b is connected to one end of the reactor 10 via a diode 9 for rectification, and the wiring member 25. The other end of the reactor 10 is connected to a high potential side terminal 2H of the second external connection terminal 2 via the wiring member 25. A center tap (middle point) of the secondary winding 7b is connected to a low potential side terminal 2L of the second external connection terminal 2 via the wiring member 25. A smoothing capacitor 11 is connected between the high potential side terminal 2H and the low potential side terminal 2L of the second external connection terminal 2.

Basic operation of the power converter will be explained briefly. The on/off control of a controller switches repeatedly in order of the first mode, the second mode, the third mode, and the fourth mode.

In the first mode, the high potential side switching device 3aH of the first series circuit and the low potential side switching device 3bL of the second series circuit are turned on, and the low potential side switching device 3aL of the first series circuit and the high potential side switching device 3bH of the second series circuit are turned off. At this time, the current which flows through the primary winding 7a flows in a route of the high potential side terminal 1H->the switching device 3aH->the primary winding 7a->the switching device 3bL->the low potential side terminal 1L. The transformer 7 transmits power from the primary winding 7a to the secondary winding 7b. The current which flows through the secondary winding 7b flows in a route of the low potential side terminal 2L->the secondary winding 7b->the diodes 8, 9->the reactor 10->the high potential side terminal 2H.

In the second mode, all of the four switching devices 3aH, 3aL, 3bH, 3bL are turned off. At this time, current does not flow into the primary winding 7a, and power is not transmitted to the secondary winding 7b. But, on the secondary side, by self induction of the reactor 10, current flows in a route of the reactor 10->the high potential side terminal 2H->the low potential side terminal 2L->the secondary winding 7b->the diodes 8, 9->the reactor 10. At this time, since voltage is not generated in the secondary side of the transformer 7, the current IL which flows into the reactor 10 decreases.

In the third mode, the high potential side switching device 3aH of the first series circuit and the low potential side switching device 3bL of the second series circuit are turned off, and the low potential side switching device 3aL of the first series circuit and the high potential side switching device 3bH of the second series circuit are turned on. At this time, the current which flows through the primary winding 7a flows in a route of the high potential side terminal 1H->the switching device 3bH->the primary winding 7a->the switching device 3aL->the low potential side terminal 1L. The transformer 7 transmits power from the primary winding 7a to the secondary winding 7b. The current which flows through the secondary winding 7b flows in a route of the low potential side terminal 2L->the secondary winding 7b->the diodes 8, 9->the reactor 10->the high potential side terminal 2H.

In the fourth mode, all of the four switching devices 3aH, 3aL, 3bH, 3bL are turned off. At this time, current does not flow into the primary winding 7a, and power is not transmitted to the secondary winding 7b. But, on the secondary side, by self induction of the reactor 10, current flows in a route of the reactor 10->the high potential side terminal 2H->the low potential side terminal 2L->the secondary winding 7b->the diodes 8, 9->the reactor 10. At this time, since voltage is not generated in the secondary side of the transformer 7, the current IL which flows into the reactor 10 decreases. In each mode, the AC component of current which flows through the reactor 10 flows into the smoothing capacitor 11, and is smoothed.

The controller changes the on-duty of the switching devices by changing the period of each mode, and controls the output voltage of the second external connection terminal 2.

Herein, when setting the voltage of the primary winding 7a of the transformer 7 to V1, setting the winding number of the primary winding 7a set to N1, setting the current which flows through the primary winding 7a to I1, setting the voltage of the secondary winding 7b to V2, setting the winding number of the secondary winding 7b to N2, and setting the current of the secondary winding 7b to I2, in the first mode and the third mode, the relation of the next equation is established.

$$N1/N2=V1/V2=I2/I1 \qquad (1)$$

Herein, N1/N2 is called as the turn ratio of the transformer 7. Since the voltage Vin of the first external connection terminal 1 is applied to the primary winding 7a, it is V1=Vin. Accordingly, the next equation is obtained from the equation (1).

$$V2=Vin/(N1/N2) \qquad (2)$$

As shown in the equation (2), as the voltage V2 of the secondary winding 7b of the transformer 7, a voltage obtained by dividing the voltage Vin of the first external connection terminal 1 applied to the primary winding 7a by the turn ratio N1/N2 is generated. At this time, a difference voltage (=|V2−Vout|) between the voltage V2 of the secondary winding 7b and the voltage Vout of the second external connection terminal 2 is applied to the both ends of the reactor 10. Accordingly, in the first mode and the third mode, the current IL of the reactor 10 increases. At this time, a current obtained by dividing the current IL of the reactor 10 by the turn ratio flows into the primary winding 7a of the transformer 7 (=IL/(N1/N2)).

On the other hand, in the second mode and the fourth mode, since all the switching devices are turned off, the voltage Vin of the first external connection terminal 1 is no longer applied to the primary winding 7a, and it becomes V1=0. Current does not flow into the primary winding 7a, and it becomes I1=0.

At this time, the voltage Vout of the second external connection terminal 2 is applied to the reactor 10. Accordingly, in the second mode and the fourth mode, the current IL of the reactor 10 decreases. Current equivalent to the current IL which flows into the reactor 10 flows into the secondary winding 7b from the center tap, and it becomes I2=IL. Voltage is not generated in the secondary winding 7b of the transformer 7, and it becomes V2=0.

1-2. Breaking Mechanism 30

In the present embodiment, the breaking mechanism 30 is connected in series on the wiring member 25 which connects the high potential side terminal 1H of the first external connection terminal 1 and the high potential side of the semiconductor circuit 5. The breaking mechanism 30 breaks current, when the short circuit failure of the switching device 3 occurs, the high potential side terminal 1H and the low potential side terminals 1L of the first external connection terminal 1 are short-circuited, and a short-circuit current flows, for example.

<Multilayer Circuit Board>

The breaking mechanism 30 is provided with a multilayer circuit board in which a plurality of conductive patterns including a fuse pattern 31 which fuses when excessive current flows and a plurality of insulating members are laminated.

In the present embodiment, the breaking mechanism 30 is formed by the multilayer circuit board of six layers. Herein, the layer means a layer in which a conductive pattern is formed, and includes outer layers which are layers of one outside and the other outside of the multilayer circuit board. FIG. 2 shows a plan view of each layer, FIG. 3 shows a cross-sectional view cut at the A-A cross section position of FIG. 2, and FIG. 4 shows a cross-sectional view cut at the B-B cross section position of FIG. 2.

In the multilayer circuit board, the substrates 19 as the insulating member and the conductive patterns are laminated alternately without gap. The multilayer circuit board is a printed circuit board, for example. That is to say, the conductive pattern of the inner layer is surrounded by the insulation member such as a substrate 19, and is sealed between two sheets of the substrates 19. A slot may be formed in the face of the substrate 19 and the conductive pattern may be inserted in the slot.

In the present embodiment, five sheets of the substrates 19 are laminated. In both sides layers of the one substrate sheet of the outside or the middle, the conductive patterns are provided; and in the one side layers of the remaining four substrate sheets 19, the conductive patterns are provided. Each substrate 19 is formed in a rectangular plate shape.

The substrate 19 is formed of any materials which have electrical insulation. The substrate 19 is formed of a glass fiber-reinforced epoxy resin, a phenol resin, a polyphenylene sulfide (PPS), a polyether ether ketone (PEEK), and the like, for example. Or, the substrate 19 is formed of a film of polyethylene terephthalate (PET) or polyimide (PI), or a paper formed of aramid (wholly aromatic polyamide) fiber, for example. The substrate 19 may be formed of a ceramic materials, such as an aluminum oxide ($Al_2O_3$) or aluminum nitride (AlN). The substrate 19 can insulate between the conductive patterns formed in each layer.

<First and Second Terminal Patterns>

As shown in FIG. 2 and FIG. 3, in each layer (face of each substrate 19), the first terminal pattern 21 and the second terminal pattern 22 are provided with an interval therebetween. Viewing in the normal direction of the circuit board face, the first terminal patterns 21 of respective layers are disposed at a position overlapping with each other. Viewing in the normal direction of the circuit board face, the second terminal patterns 22 of respective layers are disposed at a position overlapping with each other. The first and the second terminal patterns 21, 22 are formed of a copper foil, and are formed in a rectangular plate shape in this example.

The first terminal patterns 21 of respective layers are connected with each other so as to become the same electric potential by a conductive cylindrical tubular through hole 16 which penetrates each substrate 19. In this example, the five through holes 16 are provided. The second terminal patterns 22 of respective layers are connected with each other so as to become the same electric potential by a conductive cylindrical tubular through hole 16 which penetrates each substrate 19. In this example, the five through holes 16 are provided.

The first terminal pattern 21 is connected to the high potential side terminal 1H of the first external connection terminal 1 via the wiring member 25 (for example, a wiring pattern or a harness) which is not shown. The second terminal pattern 22 is connected to the high potential side of the semiconductor circuit 5 via the wiring member 25 (for example, a wiring pattern or a harness) which is not shown. Since the breaking mechanism 30 has no directionality, the first terminal pattern 21 may be connected to the high potential side of the semiconductor circuit 5, and the second terminal pattern 22 may be connected to the high potential side terminal 1H of the first external connection terminal 1.

<Fuse Pattern>

The fuse pattern 31 is provided in the inner layer. The fuse pattern 31 is connected between the first terminal pattern 21 and the second terminal pattern 22.

In the present embodiment, the fuse pattern 31 is provided in the third layer. The fuse pattern 31 is formed of a copper foil. The fuse pattern 31 is provided with a first terminal side base part 33 connected to the first terminal pattern 21, a second terminal side base part 34 connected to the second terminal pattern 22, and a fuse part 35 which connects between the first terminal side base part 33 and the second terminal side base part 34. The fuse part 35 is sealed within the multilayer circuit board.

A cross-section area of the fuse part 35 becomes smaller than a cross-section area of the first terminal side base part 33 and the second terminal side base part 34. The fuse part 35 is a fusing part which fuses when excess current flows. One or both of the length and the cross-section area of the fuse part 35 are adjusted, and a resistance value [$\Omega$] of the fuse part 35 is adjusted.

<Scattering Prevention Pattern>

The scattering prevention pattern 40 is provided in a layer different from a layer provided with the fuse pattern 31, and overlaps with at least a part of the fusing part (in this example, the fuse part 35) of the fuse pattern 31, viewing in the normal direction of the circuit board face.

In the present embodiment, a plurality of scattering prevention patterns 40 (in this example, two) are provided in mutually different layers. The first scattering prevention pattern 40a is provided in a layer of the other side than a layer provided with the fuse pattern 31. The second scattering prevention pattern 40b is provided in a layer of one side than the layer provided with the fuse pattern 31. The first scattering prevention pattern 40a is provided in the first layer which is an outer layer of the other side, and the second scattering prevention pattern 40b is provided in the sixth layer which is an outer layer of one side.

Each scattering prevention pattern 40 is provided with a body part 41 which overlaps with the fuse part 35, viewing in the normal direction of the circuit board face, and a connection part 42 which connects the body part 41 with the support member 50 side. The connection part 42 extends from the body part 41 to one side X1 of the lateral direction. The connection part 42 is formed of the copper foil similar to the body part 41.

The body part 41 of each of the first and the second scattering prevention patterns 40a, 40b is formed in a rectangular plate shape which covers the whole fuse part 35 which is a fusing part. Therefore, the first and the second scattering prevention patterns 40a, 40b overlap with the whole fuse part 35, viewing in the normal direction of the circuit board face. The first and the second scattering prevention patterns 40a, 40b are formed of a copper foil. The first and the second scattering prevention patterns 40a, 40b are not electrically connected to the fuse pattern 31, and these are different potentials.

<Connection Pattern and Through Hole>

The multilayer circuit board is provided with conductive connection patterns 43 provided in respective layers, and a tubular through hole 45 which penetrates the connection patterns 43 of respective layers and electrically conducts the connection patterns 43 with each other, at a position where overlaps with each other when viewing in the normal direction of the circuit board face. The through hole 45 penetrates the multilayer circuit board, and opens to the one side circuit board face and the other side circuit board face. The each scattering prevention pattern 40 is connected with the connection pattern 43 provided in the same layer as the each scattering prevention pattern 43. The each scattering prevention pattern 40 is connected with the connection pattern 43 electrically and thermally.

In the present embodiment, the first connection pattern 43*a* and the second connection pattern 43*b* are provided in each layer. The first connection patterns 43*a* of respective layers are disposed at a position overlapping with each other, viewing in the normal direction of the circuit board face. A first through hole 45*a* which penetrates the first connection patterns 43*a* of respective layers is provided. The second connection patterns 43*a* of respective layers are disposed at a position overlapping with each other, viewing in the normal direction of the circuit board face. A second through hole 45*b* which penetrates the second connection patterns 43*b* of respective layers is provided.

The first and the second connection patterns 43*a*, 43*b* are disposed on one side X1 of a lateral direction, with respect to the fuse pattern 31, viewing in the normal direction of the circuit board face. Herein, the lateral direction X is a direction orthogonal to an extending direction Y of the fuse pattern 31.

The first connection pattern 43*a* is disposed on one side Y1 of the extending direction than the central part of the fuse pattern 31 in the extending direction Y, viewing in the normal direction of the circuit board face. The second connection pattern 43*b* is disposed on the other side Y2 of the extending direction than the central part of the fuse pattern 31 in the extending direction Y, viewing in the normal direction of the circuit board face. The fuse part 35 which is the fusing part is provided in the central part of the fuse pattern 31.

In each layer, the first connection pattern 43*a* is provided on one side X1 of the lateral direction of the first terminal pattern 21 with an interval. In each layer, the second connection pattern 43*b* is provided on one side X1 of the lateral direction of the second terminal pattern 22 with an interval. The first connection patterns 43*a* of respective layers are disposed at a position overlapping with each other, viewing in the normal direction of the circuit board face, and are connected so as to become the same electric potential by a conductive cylindrical tubular first through hole 45*a* (in this example, one) which penetrates the each first connection pattern 43*a* and the each substrate 19. The second connection patterns 43*b* of respective layers are disposed at a position overlapping with each other, viewing in the normal direction of the circuit board face, and are connected so as to become the same electric potential by a conductive cylindrical tubular second through hole 45*b* (in this example, one) which penetrates the each second connection pattern 43*b* and the each substrate 19. The first and the second connection patterns 43*a*, 43*b* are formed of a copper foil, and are formed in a rectangular plate shape in this example. A plurality of the first and the second through holes 45*a*, 45*b* may be provided.

The each scattering prevention pattern 40 is connected to the first and the second connection patterns 43*a*, 43*b* which were provided in the same layer. The connection part 42 of each scattering prevention pattern 40 extends between the first connection pattern 43*a* and the second connection patterns 43*b*. The body part 41 of each scattering prevention pattern 40 extends from the connection part 42 to the fuse pattern 31 side.

The fuse pattern 31, the first terminal pattern 21, the second terminal pattern 22, the each scattering prevention pattern 40, the connection pattern 43, the through hole 16 of the first and the second terminal patterns, and the through hole 45 of the connection pattern 43 are formed of a conductive material. For example, these are formed of any material selected from a group which consists of copper, silver (Ag), gold (Au), tin (Sn), aluminum (Al), copper alloy, nickel (Ni) alloy, gold alloy, silver alloy, tin alloy, and aluminum alloy. These may be formed of the same material, or may be formed of different materials.

<Fusing by Short-Circuit Current>

Figure 5:
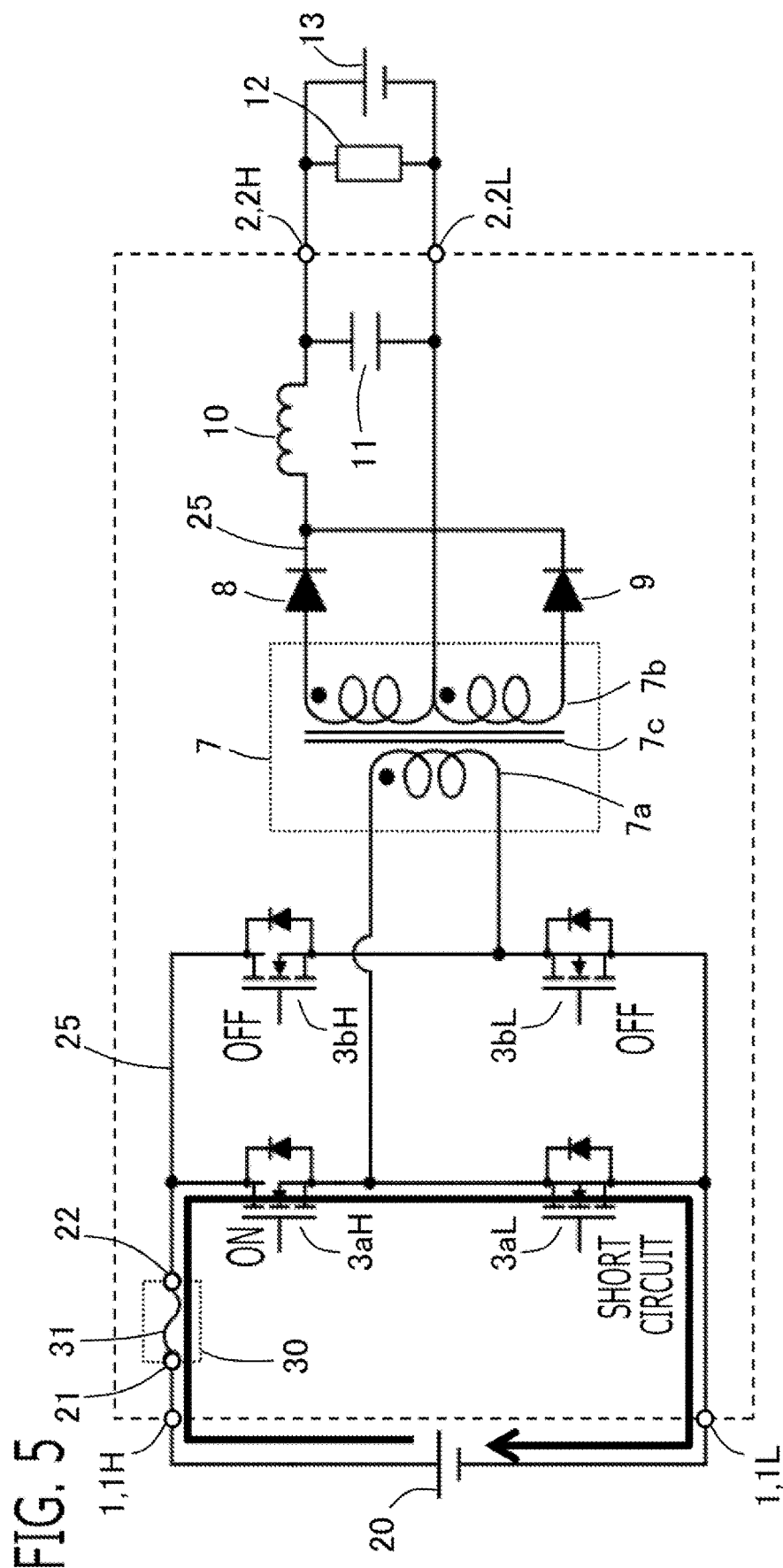
FIG. 5 is a circuit diagram explaining the short-circuit current according to Embodiment 1.

Herein, using an example that the switching device is short-circuited in the first mode, a behavior of the fuse pattern and a breaking principle of the DC current will be explained. As shown in FIG. 5, when the low potential side switching device 3*a*L of the first series circuit which is turned off is short-circuited in the first mode, the first series circuit is short-circuited, and a short-circuit current flows through the breaking mechanism 30.

The short-circuit current is larger than the current in normal operation. And, since the cross-section area of the fuse part 35 is smaller than other parts, and the resistance value of the fuse part 35 is larger than other parts, the heating amount of the fuse part 35 becomes large, and the fuse part 35 fuses.

When the fuse part 35 fuses, an arc discharge is generated so as to connect the both ends of the fuse part 35. Since the zero point of current does not exist if the current to break is a DC current, the arc discharge is continuously generated even if the wiring pattern is fused, it electrically connects, and current continuously flows. When current continuously flows, the switching devices 3*a*H, 3*a*L, or other electronic components and wiring patterns within the closed circuit generate heat, and there is anxiety that the power converter is damaged. Accordingly, it is necessary to forcibly limit current to create a zero point and to break the arc discharge.

A circuit equation of the closed circuit of FIG. 5 becomes the equation (3).

$$V\text{in} = i \times (R+r) + L \times di/dt \quad (3)$$

Herein, Vin is a voltage of the first external connection terminal 1, i is a current which flows through the closed circuit, R is a resistance value of the closed circuit except the fuse part, r is a resistance value of the fuse part (it is a resistance value of the arc discharge after generation of the arc discharge), L is a reactance of the closed circuit, and t is time.

Since after generation of the arc discharge of the fuse part which can limit current, it becomes R<<r, and it can be approximated to (R+r)≈r, the equation (3) can be modified into the equation (4).

$$di/dt = (V\text{in} - i \times r)/L \quad (4)$$

According to the equation (4), it is necessary to make di/dt of the left side a negative value (di/dt<0) in order to limit current, it is necessary to make the arc voltage (i×r) higher than the voltage Vin of the first external connection terminal 1. In order to make the arc voltage higher, the resistance value r of the arc discharge needs to be increased. The resistance value r of the arc discharge is generally expressed by the equation (5).

$$r = L/(\sigma \times Ar) \quad (5)$$

Herein, L is a length [m] of the arc discharge, σ is an electric conductivity [S/m] of the arc discharge, and Ar is a cross-section area [m$^2$] of the arc discharge.

According to the equation (5), in order to increase the resistance value r of the arc discharge, the length L of the arc discharge may be longer, or the diameter of the arc discharge may be smaller to decrease the cross-section area Ar, or the electric conductivity σ of the arc discharge may be smaller.

Comparative Example

As a comparative example, a case where the fuse pattern is provided in the outer layer of the circuit board is considered. In the comparative example, the arc discharge which is generated in the outer layer can change freely in the air, and the diameter of the arc discharge is not limited. Therefore, the diameter of arc discharge becomes large, and the cross-section area Ar of the arc discharge becomes large. Accordingly, the resistance value r of the arc discharge and the arc voltage (i×r) become small, and di/dt of the equation (4) may become a positive value and may be unable to break current.

In the comparative example, the fused material and the conductive material of the fuse pattern in the outer layer scatter to other circuits, and there is a possibility of damaging the electrical component. And, in the comparative example, since it is difficult to provide the scattering prevention pattern which covers the fuse pattern in the outer layer, the electromagnetic noise in the normal circuit operation and at the short circuit breaking cannot be shielded, the electromagnetic noise may give an adverse influence on other electrical components, and may cause malfunction.

Moreover, in the comparative example, since the part of the fuse pattern in the outer layer whose the cross-section area becomes small has a resistance value larger than other parts, the heating amount in the normal circuit operation becomes large, and thermal diffusion is low since it is provided in the outer layer. Accordingly, the temperature of the fuse pattern becomes high and, in the worst case, there is a possibility of damaging.

<Effect of Fuse Part and Scattering Prevention Pattern>

Then, in the present embodiment, as mentioned above, the fuse pattern 31 is provided in the inner layer of the multilayer circuit board.

Figure 6:
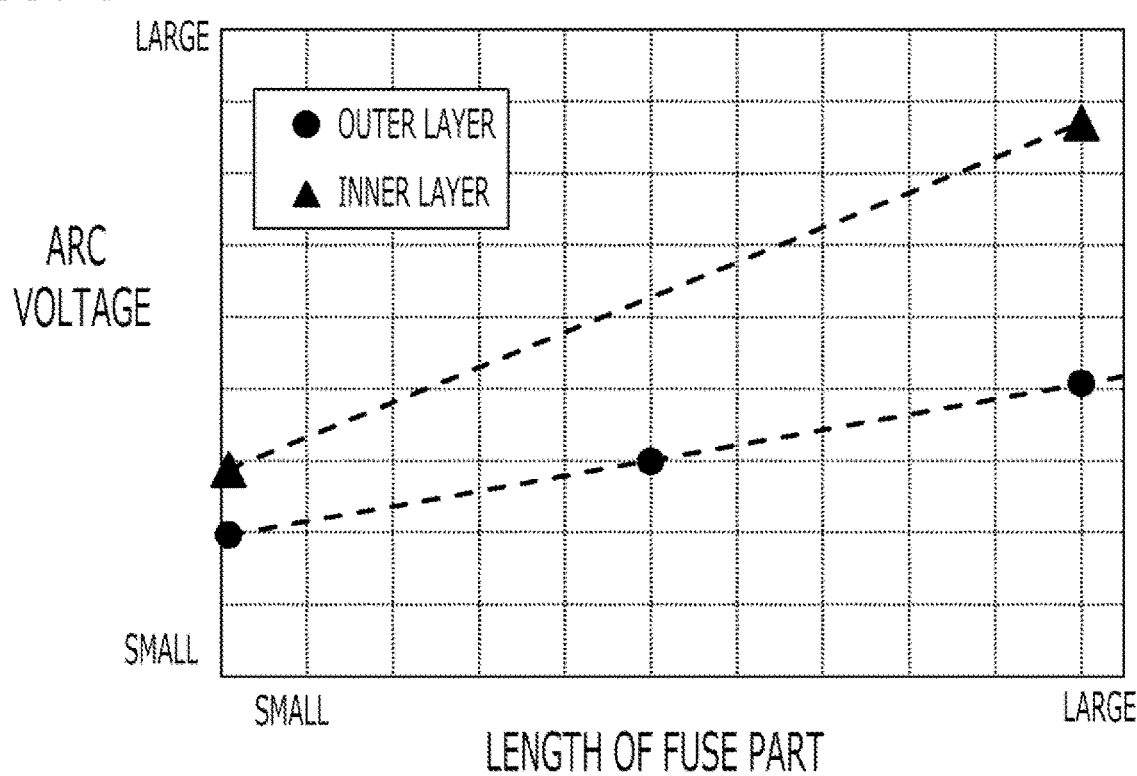
FIG. 6 is a figure explaining the characteristics of the arc voltage of the fuse part of the outer layer and the fuse part of the inner layer according to Embodiment 1.

FIG. 6 shows measured result of the arc voltage when the fuse pattern (the fuse part) is disposed in the inner layer and when the fuse pattern is disposed in the outer layer. As the length of the fuse part whose cross-section area becomes small becomes longer, the arc voltage becomes higher. The arc voltage of the fuse part disposed in the inner layer becomes higher than the arc voltage of the fuse part disposed in the outer layer.

The fuse part 35 is disposed in the inner layer, and is surrounded by the substrate 19. Therefore, the arc discharge is limited in the space within the substrate 19, and the cross-section area Ar of the arc discharge does not become large. A decomposition gas is emitted from the substrate 19 by exposing the substrate 19 to the arc discharge. By the decomposition gas, the cross-section area Ar of the arc discharge becomes smaller than the cross-section area of the space within the substrate 19 (the ablation effect). As a result, as shown in the equation (5), the resistance value r of the arc discharge in inverse proportion to the cross-section area Ar of the arc discharge becomes high, and the arc voltage (i×r) becomes high. Therefore, di/dt of the equation (4) can be made a negative value, the arc discharge current which is generated after fusing can be decreased gradually, and current can be broken.

As shown in the equation (5), as the length L of the arc discharge becomes longer, the resistance value r of the arc discharge becomes larger. As shown in the equation (4), the length of the fuse part 35 is set so that the arc voltage (i×r) becomes larger than the predetermined voltage Vin of the first external connection terminal 1 and di/dt becomes a negative value. As long as the fuse part 35 fuses, the shape of the fuse part 35, such as the cross-section area and the length, can be set to any shape.

In the present embodiment, as mentioned above, the scattering prevention pattern 40 is provided in the layer different from the fuse pattern 31, and overlaps with at least a fusing part of the fuse pattern 31, viewing in the normal direction of the circuit board face.

According to this configuration, the scattering prevention pattern 40 can suppress that the fused material and the conductive material of the fuse pattern 31 scatter to other circuits. Since the scattering prevention pattern 40 is made of metal, it can shield the electromagnetic noise at the short circuit breaking, and can suppress giving the adverse influences, such as malfunction, on other electrical components. Although the electromagnetic noise is generated when current flows through the fuse part 35 having the small cross-section area in the normal circuit operation, the scattering prevention pattern 40 can shield the electromagnetic noise. Moreover, the scattering prevention pattern 40 can radiate and diffuse the heat of fuse pattern generated in the normal circuit operation, and it can suppress the temperature rise of the multilayer circuit board. In the present embodiment, since the scattering prevention pattern 40 is provided in the outer layer, the heat dissipation from the scattering prevention pattern 40 to the outside can be increased, and the heat radiation effect by the scattering prevention pattern 40 is increased.

In the present embodiment, the first scattering prevention pattern 40a is provided in a layer on the other side than the fuse pattern 31, and the second scattering prevention pattern 40b is provided in a layer on the other side than the fuse pattern 31. Therefore, the fused material and the conductive material of the fuse pattern 31 can be prevented from scattering to the other side and one side of the breaking mechanism 30. Since the first and the second scattering prevention patterns 40a, 40b are disposed so as to cover the whole fuse part 35, the scattering preventing effect, the breaking effect of the electromagnetic noise, and the heat radiation effect are increased.

<Support Mechanism>

When the fuse part 35 fuses or an arc discharge occurs after fusing, high energy is generated inside the circuit board centering on the fuse part 35. Accordingly, the fuse part 35 and the substrate 19 may exfoliate and the space where the fuse part 35 is provided may be expanded. If the space is expanded, the diameter of arc discharge becomes thick by the expanded amount of the space, and the cross-section area Ar of arc discharge becomes large. Accordingly, the resistance value r of the arc discharge and the arc voltage (i×r) become small, and di/dt of the equation (4) may become a positive value and may be unable to break current.

Then, as shown in FIG. 3 and FIG. 4, the breaking mechanism 30 is provided with the support member 50 which supports the multilayer circuit board. The support member 50 is provided with a support body part 55; a fixation projection part 46 which projected from the support body part 55 to the multilayer circuit board side and to which the multilayer circuit board was fixed; and a support projection part 48 which projected from the support body part 55 to the multilayer circuit board side and supports an one side circuit board face (in this example, one side face of the sixth layer) of the multilayer circuit board.

As shown in FIG. 2, the support projection part 48 overlaps with at least one part of the fuse part 35 which is a fusing part of the fuse pattern 31, viewing in the normal direction of the circuit board face of the multilayer circuit board.

According to this configuration, the support projection part 48 can press a part of the multilayer circuit board where the fuse part 35 generating force at fusing was provided, from the one side circuit board face side. The multilayer circuit board can be suppressed effectively from exfoliating due to the force generated at fusing. And, since the fixation projection part 46 and the support projection part 48 are provided, the breaking mechanism 30 can be supported while spacing from the support body part 55, and it is easy to secure the insulation between the fuse pattern 31 and the like and the support member 50 at fusing and at un-fusing. The support projection part 48 can support intensively the part of the multilayer circuit board where the fuse part 35 was provided.

The multilayer circuit board is fixed to the fixation projection part 46 by the fixing part 51. The one side circuit board face of the multilayer circuit board is pressed to the support projection part 48 by a pressing force of the fixing part 51 which presses the multilayer circuit board to the fixation projection part 46 side.

According to this configuration, since it is pressed at un-fusing and there is no gap between the support projection part 48 and the multilayer circuit board, the support projection part 48 can support certainly the part of the multilayer circuit board in which the fuse part 35 was provided at fusing, and the exfoliation preventive effect of the multilayer circuit board can be made certain more.

In the present embodiment, a projection height of the support projection part 48 to the multilayer circuit board side is the same as a projection height of the fixation projection part 46 to the multilayer circuit board side. The projection height of the support projection part 48 to the multilayer circuit board side is higher than the projection height of the fixation projection part 46 to the multilayer circuit board side.

According to this configuration, the support projection part 48 can be certainly contacted to the one side circuit board face of the multilayer circuit board. If the projection height of the support projection part 48 is higher than the projection height of the fixation projection part 46, even if the projection height of each projection part changes due to manufacturing variation, the support projection part 48 can be contacted to the multilayer circuit board more certainly. the projection height of the support projection part 48 may be set considering the dimensional tolerance in production so that the projection height of the support projection part 48 becomes higher than the projection height of the fixation projection part 46 even if manufacturing variation occurs.

If the projection height of the support projection part 48 is higher than the projection height of the fixation projection part 46, the support projection part 48 may have elasticity. In this case, since the support projection part 48 deforms elastically when the multilayer circuit board is fixed to the fixation projection part 46, the occurrence of strain in the multilayer circuit board can be suppressed.

As shown in FIG. 4, the fixing part 51 which fixes the multilayer circuit board to the fixation projection part 46 penetrates the through hole 45. According to this configuration, it can be fixed utilizing the through hole 45 which connects the connection pattern 43 of each layer, and it is not necessary to provide a dedicated through hole for fixation in the multilayer circuit board, and reduction of the manufacturing cost and the miniaturization can be achieved.

In the present embodiment, the fixation projection part 46 is provided with a screw hole 47 opened to the multilayer circuit board side. The screw 51 as the fixing part 51 penetrates the through hole 45 of the multilayer circuit board, and is screwed in the screw hole 47, and the multilayer circuit board is fixed to the fixation projection part 46. By screwing the screw 51 in the screw hole 47 of the fixation projection part 46, the multilayer circuit board is easily pressed to the fixation projection part 46 side. By its pressing force, the one side circuit board face of the multilayer circuit board can be pressed to the support projection part 48. By managing the pressure torque of the screw 51, the pressing force between the one side circuit board face of the multilayer circuit board and the support projection part 48 can be managed, and the exfoliation preventive effect of the multilayer circuit board at fusing by the support projection part 48 can be made certain more.

The multilayer circuit board can be pinched from both sides by the fixing part 51 and the fixation projection part 46, and the multilayer circuit board can be suppressed from exfoliating at fusing.

The support member 50 and the scattering prevention pattern 40 can be connected by the fixation projection part 46 and the fixing part 51. That is to say, the scattering prevention pattern 40 is connected to the support body part 55 via the connection pattern 43, the through hole 45, the fixing part 51, and the fixation projection part 46. The support body part 55 and the scattering prevention pattern 40 are connected electrically and thermally. Accordingly, the radiation effect and the breaking effect of the electromagnetic noise by the scattering prevention pattern 40 mentioned above can be increased. The support body part 55 has the ground potential, and the scattering prevention pattern 40 connected to the support body part 55 has the ground potential. Since the scattering prevention pattern 40 has the ground potential, the breaking effect of the electromagnetic noise can be increased. From the scattering prevention pattern 40 to the support member 50, heat is transferred efficiently and heat can be radiated. Accordingly, the radiation performance of heat generated in the fuse part 35 can be improved.

In the present embodiment, the first fixation projection part 46a to which the first fixing part 51a penetrating the first through hole 45a was connected, and the second fixation projection part 46b to which the second fixing part 51b penetrating the second through hole 45b was connected are provided.

Similarly to the first and the second connection patterns 43a, 43b mentioned above, the first and the second fixation projection parts 46a, 46b are disposed on one side X1 of the lateral direction, with respect to the fuse pattern 31, viewing in the normal direction of the circuit board face. Similarly to the first connection pattern 43a mentioned above, the first fixation projection part 46a is disposed on one side Y1 of the extending direction than the central part of the fuse pattern 31 in the extending direction Y, viewing in the normal direction of the circuit board face. Similar to the second connection pattern 43b, the second fixation projection part 46b is disposed on the other side Y2 of the extending direction than the central part of the fuse pattern 31 in the extending direction Y, viewing in the normal direction of the circuit board face. The fuse part 35 which is the fusing part of the fuse pattern 31 is provided in the central part of the fuse pattern 31. The support projection part 48 overlaps with the central part of the fuse pattern, viewing in the normal direction of the circuit board face.

According to this configuration, since the first fixation projection part 46a is disposed on the one side Y1 of the extending direction with respect to the support projection part 48, and the second fixation projection part 46b is disposed on the other side Y2 of the extending direction, a pressing force pressing the multilayer circuit board to the support projection part 48 from the both sides of the extending direction Y of the fuse pattern 31 with respect to the support projection part 48 can be generated. Accordingly, the multilayer circuit board can be certainly pressed to the support projection part 48, the exfoliation preventive effect of the multilayer circuit board at fusing by the support projection part 48 can be made certain more.

The multilayer circuit board can be pinched by the first fixing part 51a and the first fixation projection part 46a, and the second fixing part 51b and the second fixation projection part 46b, on the both sides of the extending direction Y with respect to the fuse part 35, and the exfoliation preventive effect of the multilayer circuit board at fusing can be made certain more.

The fuse part 35 can be pressed by the scattering prevention pattern 40 at fusing, and the multilayer circuit board can be suppressed from exfoliating at fusing. Since the first and the second scattering prevention patterns 40a, 40b are provided on the both sides of the fuse part 35, the fuse part 35 can be pressed from both sides at fusing, and the exfoliation preventive effect of the multilayer circuit board at fusing can be increased.

In the present embodiment, the second scattering prevention pattern 40b is provided in the one side outer layer of the multilayer circuit board (in this example, the sixth layer), and the support projection part 48 supports the one side face of the second scattering prevention pattern 40b.

According to this configuration, the second scattering prevention pattern 40b can be directly supported by the support projection part 48, and the exfoliation preventive effect of the multilayer circuit board at fusing by the second scattering prevention pattern 40b can be increased. The second scattering prevention pattern 40b can be thermally and electrically connected to the support body part 55 via the support projection part 48, and the radiation effect and the breaking effect of electromagnetic noise can be increased.

Thermal conductivity of the support member 50 is preferably greater than or equal to 0.1 W/(m×K). Thermal conductivity of the support member 50 is more preferably greater than or equal to 1.0 W/(m×K). Thermal conductivity of the support member 50 is further preferably greater than or equal to 10.0 W/(m×K).

The support member 50 is preferably formed of a rigid material. Specifically, the support member 50 is formed of any metallic material selected from a group which consists of copper (Cu), aluminum (Al), iron (Fe), iron alloy such as SUS304, copper alloy such as phosphor bronze, and aluminum alloy such as ADC12. Other, the support member 50 may be formed of a resin material containing a thermally conductive filler. Herein, as the resin material, for example, a poly butylene terephthalate (PBT), polyphenylene sulfide (PPS), polyether ether ketone (PEEK), or the like is used. The support member 50 may be a cooler. For example, the face opposite to the face where the fixation projection part 46 and the support projection part 48 were provided may be cooled by a refrigerant of air or fluid. Or, a refrigerant passage through which the refrigerant flows may be provided inside the support member 50.

The support body part 55, the fixation projection part 46, and the support projection part 48 are formed integrally. In this case, the support body part 55, the fixation projection part 46, and the support projection part 48 are formed of the same material. The support body part 55, the fixation projection part 46, and the support projection part 48 may be separately formed, and may be connected with each other. In this case, the support body part 55, the fixation projection part 46, and the support projection part 48 may be formed of the same material, or may be formed of different materials. The support member 50 is formed by cutting, die-casting, forging, metal molding, or the like, for example.

The voltage applied to the first terminal pattern 21 and the second terminal pattern 22 of the breaking mechanism 30 (in this example, the voltage Vin of the first external connection terminal 1) is not specified. But, generally, when the applied voltage exceeds 20V, the arc discharge is easily generated, and it becomes easy to obtain the breaking effect of the arc discharge of present disclosure. That is to say, if the voltage supplied to the breaking mechanism 30 is a DC voltage greater than or equal to 20V, the breaking effect of the arc discharge of the present disclosure can be easily obtained. Even if the supply voltage is less than 20V and the arc discharge is not generated after fusing, the scattering preventing effect of the fused material is obtained by providing the fuse pattern in the inner layer, and the scattering preventing effect of the fused material, the breaking effect of the electromagnetic noise, the radiation effect, and the exfoliation preventive effect of the multilayer circuit board are obtained by providing the scattering prevention pattern 40 and the support construction, as mentioned above.

2. Embodiment 2

Next, the power converter according to Embodiment 2 will be explained. The explanation for constituent parts the same as those in Embodiment 1 will be omitted. The basic configuration of the power converter according to the present embodiment is the same as that of Embodiment 1. The configuration of the first and the second scattering prevention patterns 40a, 40b is different from that of Embodiment 1.

Figure 7:
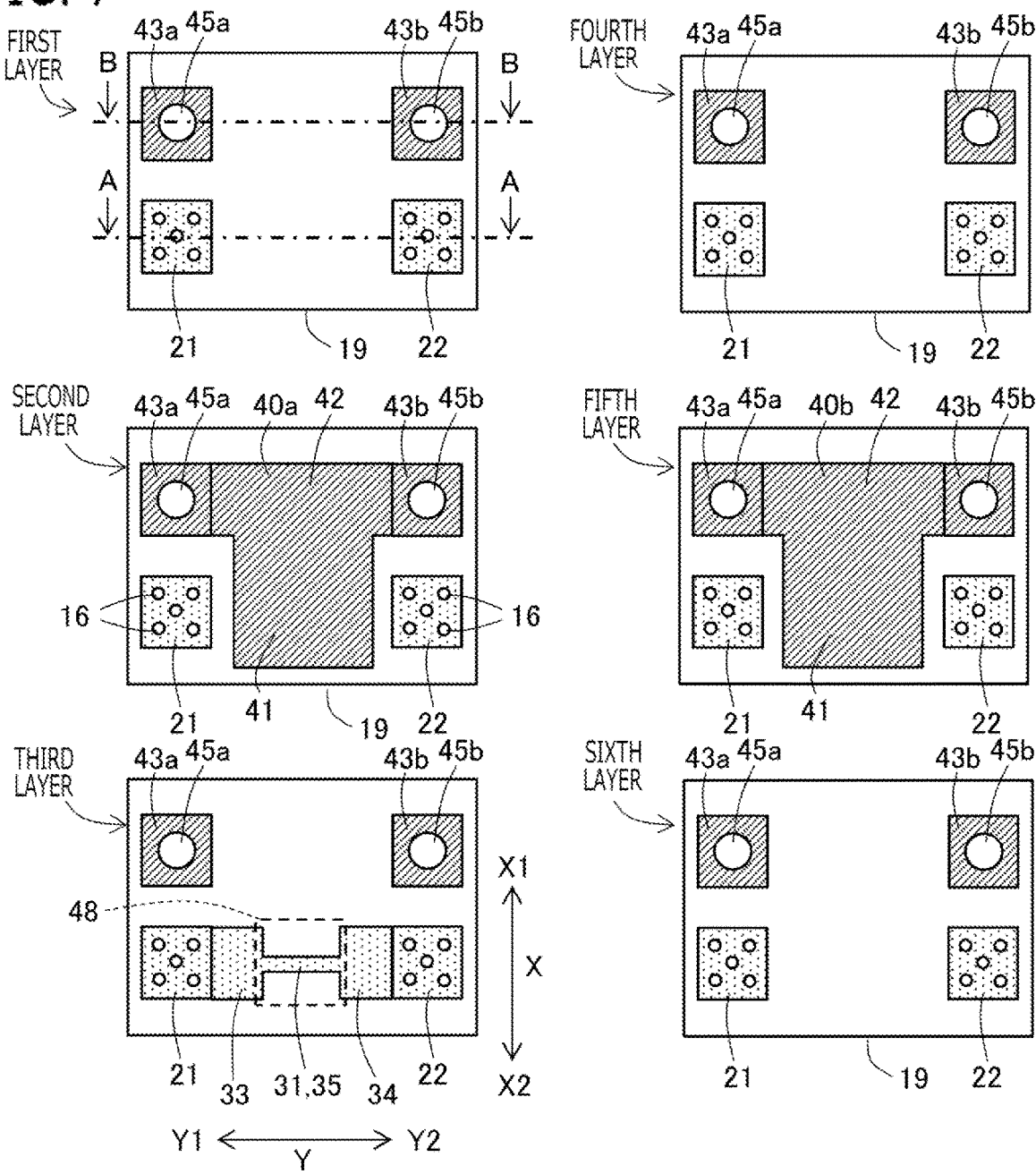
FIG. 7 is a plan view of each layer of the multilayer circuit board according to Embodiment 2.
Figure 8:
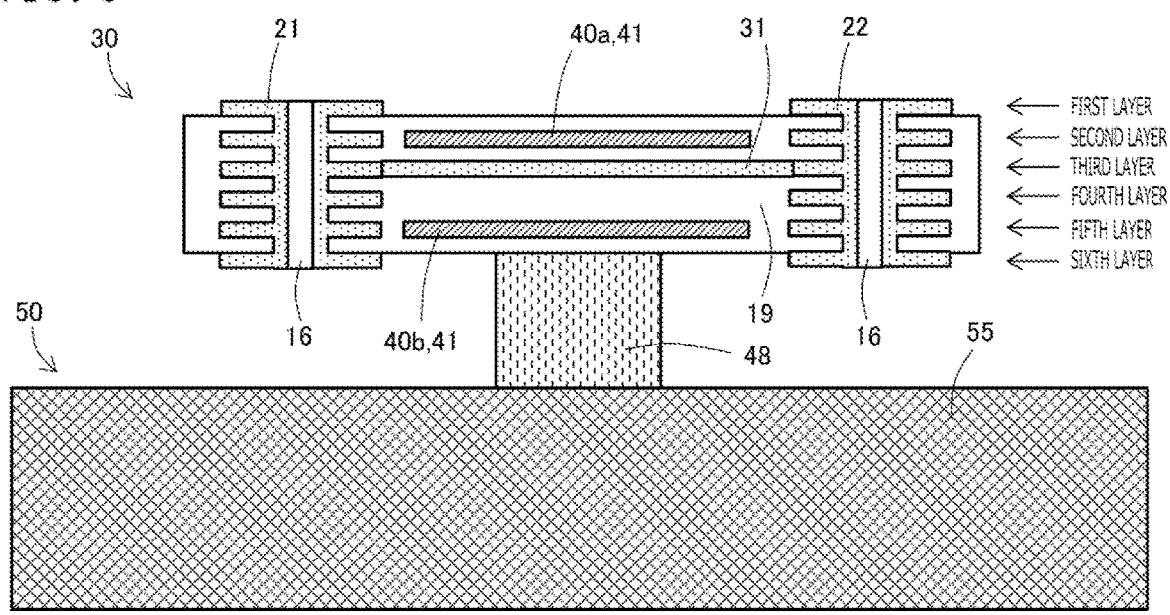
FIG. 8 is a cross-sectional view of the multilayer circuit board cut at the A-A cross section position of FIG. 7 according to Embodiment 2.
Figure 9:
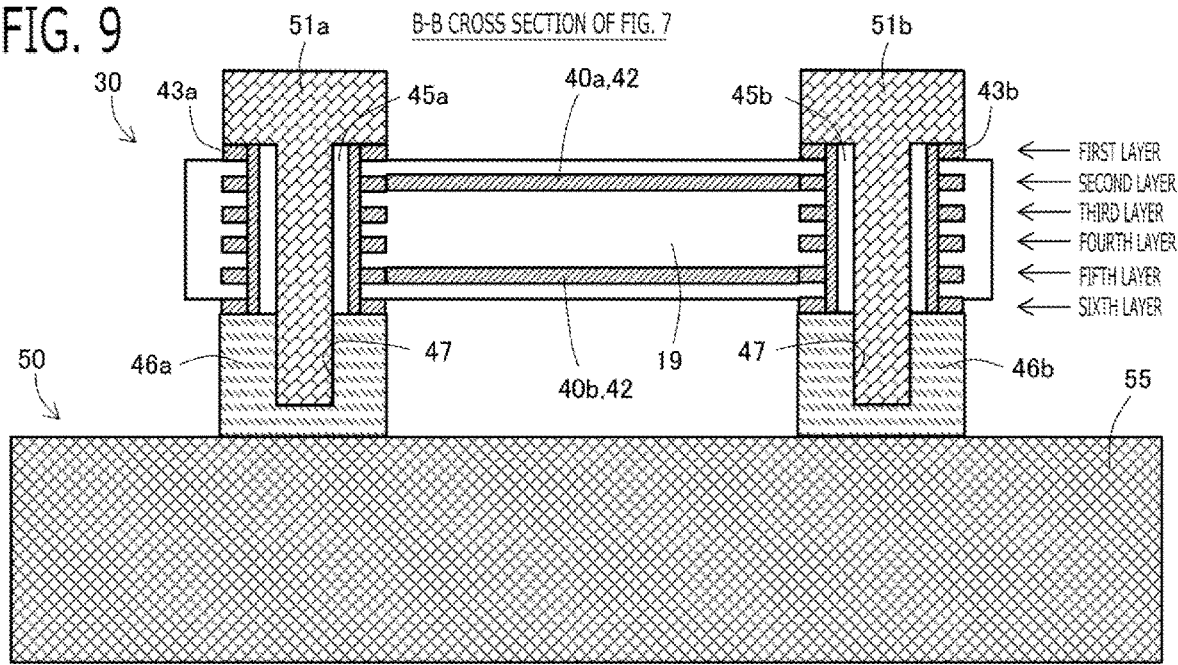
FIG. 9 is a cross-sectional view of the multilayer circuit board cut at the B-B cross section position of FIG. 7 according to Embodiment 2.

Similar to Embodiment 1, the breaking mechanism 30 is formed by the multilayer circuit board of six layers. FIG. 7 shows a plan view of each layer, FIG. 8 shows a cross-sectional view cut at the A-A cross section position of FIG. 7, and FIG. 9 shows a cross-sectional view cut at the B-B cross section position of FIG. 7.

Since it is configured similar to Embodiment 1 except the configuration of the scattering prevention pattern 40, detailed explanation is omitted.

Even in the present embodiment, the scattering prevention pattern 40 is provided in a layer different from a layer provided with the fuse pattern 31, and overlaps with at least a part of the fusing part (in this example, the fuse part 35) of the fuse pattern 31, viewing in the normal direction of the circuit board face.

Even in the present embodiment, a plurality of scattering prevention patterns 40 are provided in mutually different layers. The first scattering prevention pattern 40a is provided in a layer of the other side than a layer provided with the fuse pattern 31. The second scattering prevention pattern 40b is provided in a layer of one side than the layer provided with the fuse pattern 31.

Unlike Embodiment 1, the first scattering prevention pattern 40a and the second scattering prevention pattern 40b are provided in the inner layer of the multilayer circuit board. For example, the first scattering prevention pattern 40a is provided in the second layer of the inner layer, and the second scattering prevention pattern 40b is provided in the fifth layer of the inner layer. The second scattering prevention pattern 40b may be provided in the fourth layer of the inner layer.

By providing the scattering prevention pattern 40 in the inner layer, the scattering prevention pattern 40 can be disposed close to the fuse part 35, and the scattering preventing effect, the breaking effect of the electromagnetic noise, the heat radiation effect, and the exfoliation preventive effect of the multilayer circuit board by the scattering prevention pattern 40 can be increased.

By providing the scattering prevention pattern 40 in the inner layer, since the both sides of the scattering prevention pattern 40 are reinforced by the substrate 19, the strength of the scattering prevention pattern 40 can be increased more than the case of providing in the outer layer. Accordingly, the scattering preventing effect by the scattering prevention pattern 40 and the exfoliation preventive effect of the multilayer circuit board at fusing can be increased.

By disposing the scattering prevention pattern 40 in the inner layer, the substrate 19 which exists between the first and the second scattering prevention patterns 40a, 40b and the fuse pattern 31 can be made thin. Therefore, the pressing force by the first and the second scattering prevention patterns 40a, 40b is easily transmitted to the fuse pattern 31 via the thin substrate 19, and the exfoliation preventive effect of the multilayer circuit board at fusing can be increased.

3. Embodiment 3

Next, the power converter according to Embodiment 3 will be explained. The explanation for constituent parts the same as those in Embodiment 1 will be omitted. The basic configuration of the power converter according to the present embodiment is the same as that of Embodiment 1. But, the present embodiment is different from Embodiment 1 in that an elastic member 52 is provided.

Figure 10:
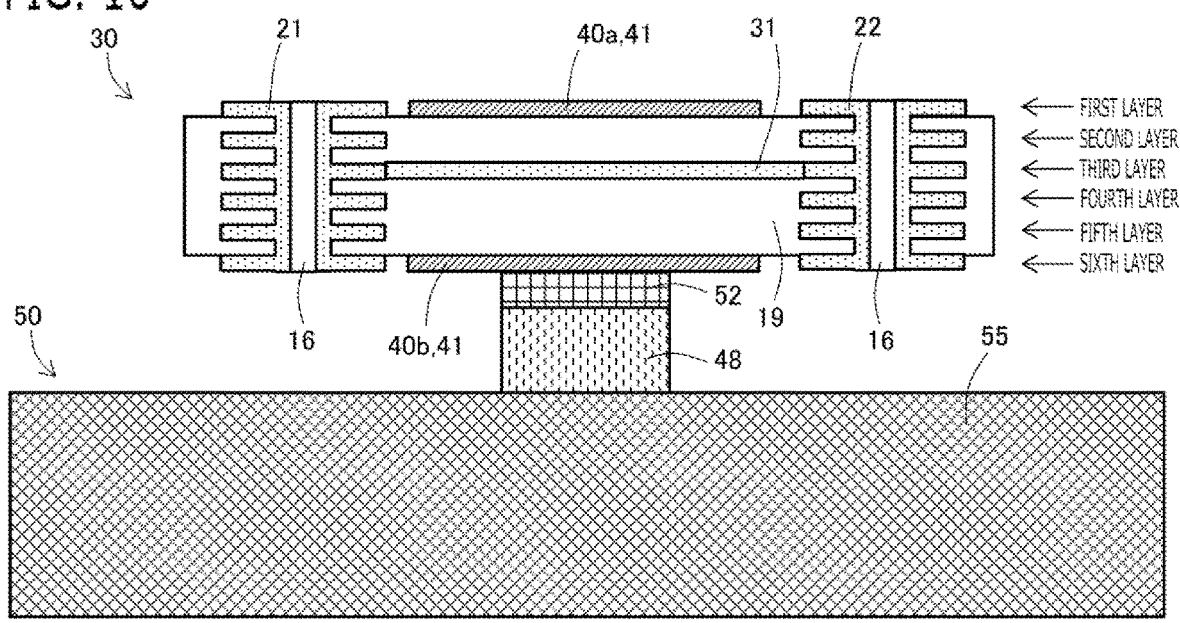
FIG. 10 is a cross-sectional view of the multilayer circuit board cut at the A-A cross section position of FIG. 2 according to Embodiment 3.

Similar to Embodiment 1, the breaking mechanism 30 is formed by the multilayer circuit board of six layers. FIG. 10 shows a cross-sectional view cut at the A-A cross section position of FIG. 2.

In the present embodiment, an elastic member 52 is interposed between the support projection part 48 and the one side circuit board face of the multilayer circuit board. In the present embodiment, the elastic member 52 is interposed and disposed between the support projection part 48 and the one side face of the scattering prevention pattern 40b. The elastic member 52 consists of a material which has elasticity, and it is deformed when interposing and a reaction force is generated.

The elastic member 52 is formed of a rubber material, for example. For example, the rubber material is isoprene rubber (IR), butadiene rubber (BR), styrene-butadiene rubber (SBR), chloroprene rubber (CR), nitrile rubber (NBR), polyisobutylene butyl rubber (IIR), ethylene-propylene rubber (EPM, EPDM), chlorosulfonated polyethylene (CSM), acrylic rubber (ACM), fluorine rubber (FKM), epichlorhydrin rubber (CO, ECO), urethane rubber (U), or silicone rubber (Q). The elastic member 52 may be formed of a material which has an elastic modulus lower than the support member 50, the fixation projection part 46, the support projection part 48, and the fixing part 51. The elastic member 52 may be a heat transfer member which contains a thermally conductive filler, for example, and thermal conductivity may be greater than or equal to 0.1 W/(m×K). The elastic member 52 may have electric insulation.

As shown in FIG. 4, the multilayer circuit board is fixed to the fixation projection part 46 by the fixing part 51. At this time, the distance between the multilayer circuit board and the support body part 55 is determined by the height of the fixation projection part 46. For example, in the case where the projection height of the support projection part 48 is higher than the projection height of the fixation projection part 46 due to the dimensional tolerance in production, and there is no elastic member 52, even if the multilayer circuit board is fixed to the fixation projection part 46 by the fixing part 51. The multilayer circuit board and the support projection part 48 do not contact. In this case, the effect of pressing the multilayer circuit board by the support projection part 48 becomes low, and there is anxiety that the sufficient exfoliation preventive effect is not obtained.

In the present embodiment, when the multilayer circuit board is fixed to the fixation projection part 46 by the fixing part 51, the elastic member 52 is deformed elastically. Accordingly, even if the dimensional tolerance in production occurs and the distance between the multilayer circuit board and the support body part 55 is varied, the elastic member 52 is contacted to the multilayer circuit board and the support body part 55, and the one side circuit board face of the multilayer circuit board can be supported by the support body part 55 via the elastic member 52. Accordingly, the exfoliation preventive effect of the multilayer circuit board at fusing by the support body part 55 can be made certain more. In the present embodiment, the projection height of the support projection part 48 is lower than the projection height of the fixation projection part 46. In the state where the multilayer circuit board is not fixed to the fixation projection part 46, the projection height of the support projection part 48 and the elastic member 52 becomes higher than the projection height of the fixation projection part 46.

If the elastic member 52 is the heat transfer member, the temperature rise of the fuse pattern 31 during the normal operation can be reduced. If the support projection part 48 and the multilayer circuit board contact directly, a contact thermal resistance is generated in its contact part, and there is anxiety that thermal resistance becomes large. However, if the elastic member 52 is the heat transfer member, the thermal resistance between the multilayer circuit board and the support projection part 48 can be reduced by the elastic member 52, and the temperature rise can be suppressed.

4. Embodiment 4

Next, the power converter according to Embodiment 4 will be explained. The explanation for constituent parts the same as those in Embodiment 1 will be omitted. The basic configuration of the power converter according to the present embodiment is the same as that of Embodiment 1. But, the present embodiment is different from Embodiment 1 in that the opposite side support member 53 is provided.

Figure 11:
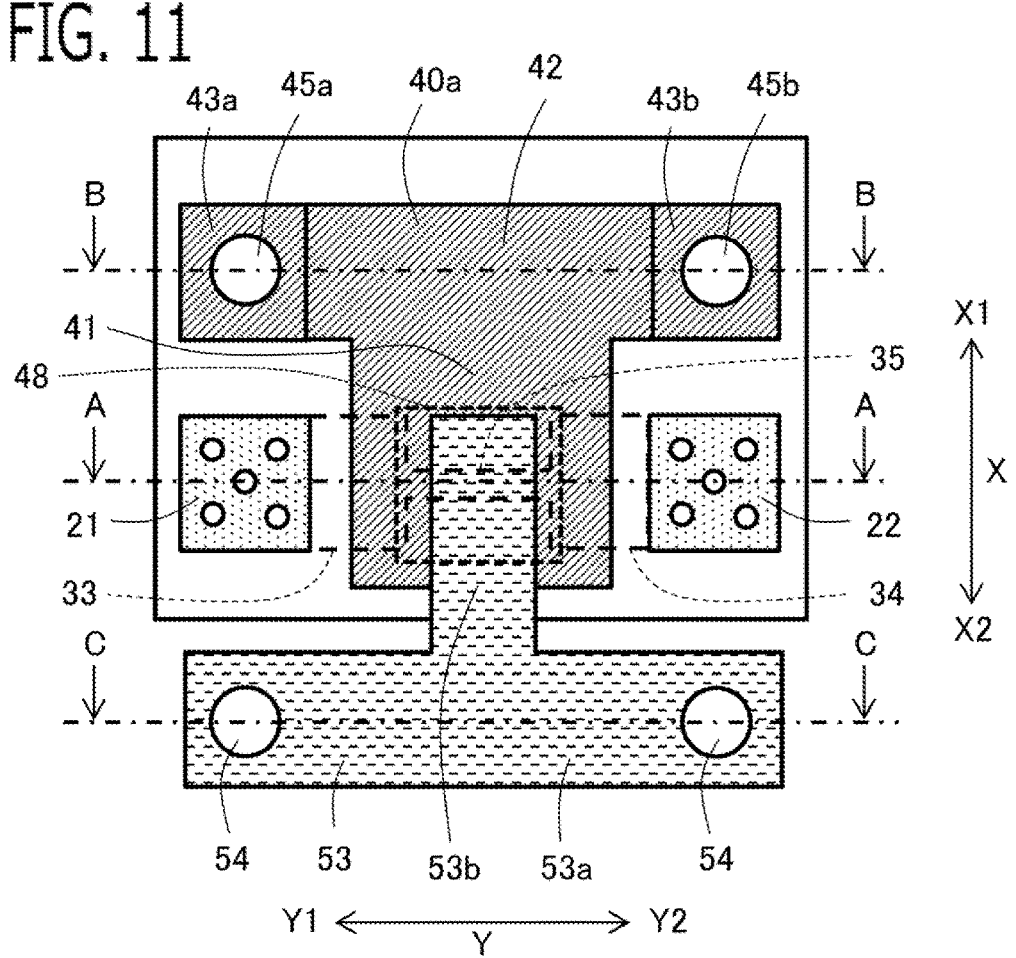
FIG. 11 is a plan views of the breaking mechanism according to Embodiment 4.

Similar to Embodiment 1, the breaking mechanism 30 is formed by the multilayer circuit board of six layers. FIG. 11 shows a plan view viewing the breaking mechanism 30 from the other side. Each fixing part is not shown. FIG. 12 shows a cross-sectional view cut at the A-A cross section position of FIG. 11, FIG. 13 shows a cross-sectional view cut at the B-B cross section position of FIG. 11, and FIG. 14 shows a cross-sectional view cut at the C-C cross section position of FIG. 11.

In the present embodiment, the breaking mechanism 30 supports the other side circuit board face of the multilayer circuit board, and is provided with an opposite side support member 53 fixed to the support member 50. The opposite side support member 53 overlaps with at least one part of the fuse part 35 which is the fusing part of the fuse pattern 31, viewing in the normal direction of the circuit board face of the multilayer circuit board.

According to this configuration, the part of the multilayer circuit board where the fuse part 35 generating force at fusing was provided can be pressed also from the other side circuit board face side by the opposite side support member 53. That is to say, the part of the multilayer circuit board where the fuse part 35 was provided can be pressed from both sides by the support projection part 48 and the opposite side support member 53. Accordingly, the exfoliation preventive effect of the multilayer circuit board at fusing can be increased. The part of the multilayer circuit board where the fuse part 35 was provided can be supported intensively by the opposite side support member part 53.

The multilayer circuit board can be pressed from the other side by the opposite side support member 53, and the resistance against vibration can be improved. By the opposite side support member 53, about the other side circuit board face of the multilayer circuit board, the scattering preventing effect of the fused material, the breaking effect of the electromagnetic noise, and the radiation effect can be increased.

The support member 50 is provided with a fixation projection part for opposite side 49 which projected from the support body part 55 to the multilayer circuit board side, on the side of the multilayer circuit board, and to which the opposite side support member 53 was fixed by a fixing part for opposite side 57. The opposite side support member 53 is pressed to the other side circuit board face of a multilayer circuit board by a pressing force of the fixing part for opposite side 57 which presses the opposite side support member 53 to the fixation projection part for opposite side 49 side. According to this configuration, by the fixation projection part for opposite side 49 and the fixing part for opposite side 57, the opposite side support member 53 can be effectively pressed to the other side circuit board face of the multilayer circuit board.

The opposite side support member 53 is thermally and electrically connected to the support member 50 via the fixing part for opposite side 57 and the fixation projection part for opposite side 49. Accordingly, the radiation effect and the breaking effect of the electromagnetic noise by the opposite side support member 53 can be increased.

Similar to Embodiment 1, the fixation projection part 46 is disposed on one side X1 of the lateral direction, with respect to the fuse pattern 31, viewing in the normal direction of the circuit board face. In the present embodiment, the support member 50 is provided with the first fixation projection part for opposite side 49a, and the second fixation projection part for opposite side 49b, the first and the second fixation projection parts for opposite side 46a, 46b are disposed on one side X1 of the lateral direction, with respect to the fuse pattern 31, viewing in the normal direction of the circuit board face.

Then, the first fixation projection part for opposite side 49a is disposed on one side Y1 of the extending direction than the central part of the fuse pattern 31 in the extending direction Y, viewing in the normal direction of the circuit board face. The second fixation projection part for opposite side 49b is disposed on the other side Y2 of the extending direction than the central part of the fuse pattern 31 in the extending direction Y, viewing in the normal direction of the circuit board face.

The fuse part 35 which is the fusing part of the fuse pattern 31 is provided in the central part of the fuse pattern 31. The opposite side support member 53 is provided with a base part 53a which extended between a fixed part fixed to the first fixation projection part for opposite side 49a and a fixed part fixed to the second fixation projection part for opposite side 49b, and a support part 53b which extends from a central part of the base part 53a to the fuse pattern 31 side, and overlaps with the central part of the fuse pattern 31, viewing in the normal direction of the circuit board face. The opposite side support member 53 is formed in T-shaped, viewing in the normal direction of the circuit board face.

According to this configuration, since the first fixation projection part for opposite side 49a is disposed on one side Y1 of the extending direction, with respect to the fuse part 35, and the second fixation projection part for opposite side 49b is disposed on the other side Y2 of the extending direction, a pressing force pressing the opposite side support member 53 to the other side circuit board face of the multilayer circuit board from the both sides of the extending direction Y of the fuse pattern 31 with respect to the fuse part 35 can be generated. Accordingly, the support projection part 48 can be certainly pressed to the opposite side support member 53, and the exfoliation preventive effect of the multilayer circuit board at fusing by the support projection part 48 can be made certain more.

Each of the first and the second fixation projection parts for opposite side 49a, 49b is provided with a screw hole 58 opened to the opposite side support member 53 side, and a screw 57 as the fixing part for opposite side 57 penetrates a through hole 54 provided in the opposite side support member 53, and is screwed in the screw hole 58, and the opposite side support member 53 is fixed to each of the first and the second fixation projection parts for opposite side 49a, 49b. According to this configuration, by screwing the screw 57 in the screw hole 58, the opposite side support member 53 can be easily pressed to the other side circuit board face of the multilayer circuit board. By managing the pressure torque of the screw 57, the pressing force between the opposite side support member 53 and the other side circuit board face of the multilayer circuit board can be managed, and the exfoliation preventive effect of the multilayer circuit board at fusing by the opposite side support member 53 can be made certain more.

In the present embodiment, the first scattering prevention pattern 40a is provided in the other side outer layer of the multilayer circuit board (in this example, the first layer), and the opposite side support member 53 supports the other side face of the first scattering prevention pattern 40a.

According to this configuration, the first scattering prevention pattern 40a can be directly supported by the opposite side support member 53, and the exfoliation preventive effect of the multilayer circuit board at fusing by the first scattering prevention pattern 40a can be increased. The first scattering prevention pattern 40a can be thermally and electrically connected to the support body part 55 via the opposite side support member 53 and the fixation projection part for opposite side 49, and the radiation effect and the breaking effect of electromagnetic noise can be increased.

The opposite side support member 53 is formed of a rigid material. For example, the opposite side support member 53 may be formed of the same material as the support member 50. The opposite side support member 53 may have elasticity. In the present embodiment, although the opposite side support member 53 is a plate, it may be a plate spring or the like, for example. As long as the opposite side support member 53 is fixed to the fixation projection part for opposite side 49, and can press the other side part of the fuse part 35, it may be any shape.

Similar to the elastic member 52 of Embodiment 3, an elastic member is interposed between the opposite side support member 53 and the other side circuit board face of the multilayer circuit board. Similar to the elastic members 52 of Embodiment 3. Against the dimensional tolerance in production, the effect of suppressing the multilayer circuit board by the opposite side support member 53 can be maintained. Similar to the elastic members 52 of Embodiment 3, the elastic member may be a heat transfer member. The contact thermal resistance between the opposite side support member 53 and the multilayer circuit board is reduced, and the suppression effect of the temperature rise can be increased. The elastic member may be provided in both of between the support projection part 48 and the multilayer circuit board and between the opposite side support member 53 and the multilayer circuit board.

5. Embodiment 5

Next, the power converter according to Embodiment 5 will be explained. The explanation for constituent parts the same as those in each of Embodiments 1 or 4 will be omitted. The basic configuration of the power converter according to the present embodiment is the same as that of Embodiment 1 or 4. But, the present embodiment is different from Embodiment 1 in the fixing method of the opposite side support member 53.

Figure 16:
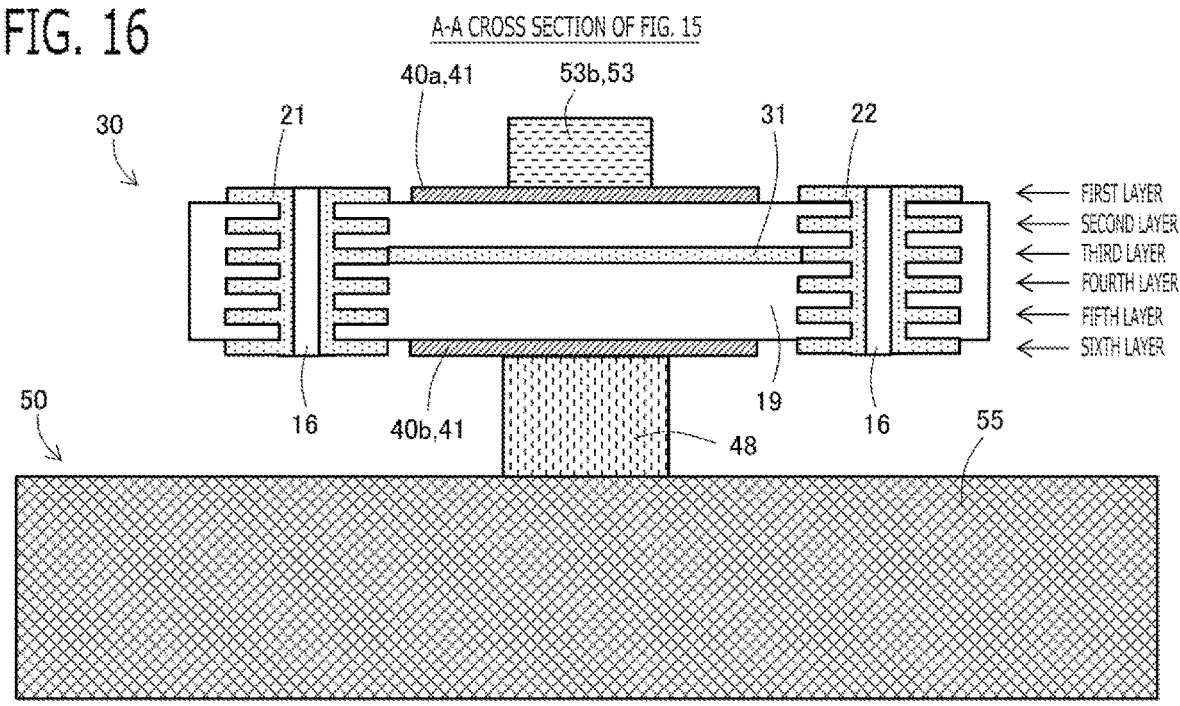
FIG. 16 is a cross-sectional view of the multilayer circuit board cut at the A-A cross section position of FIG. 15 according to Embodiment 5.
Figure 17:
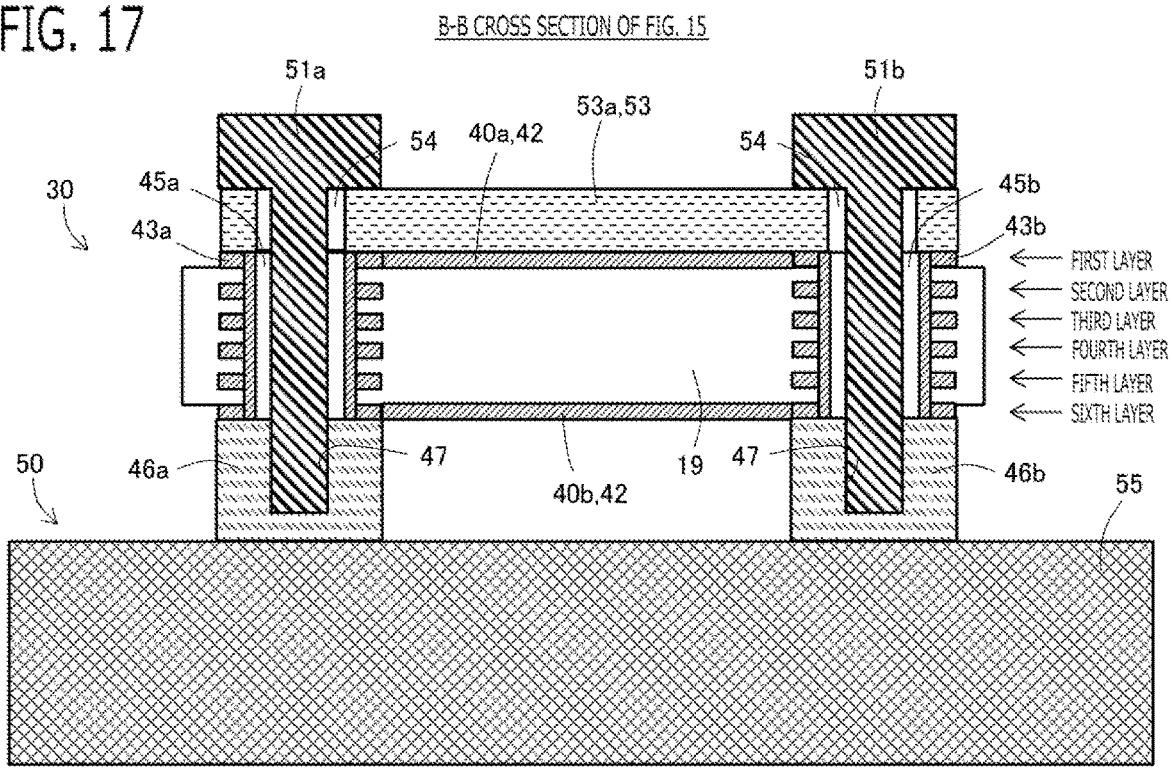
FIG. 17 is a cross-sectional view of the multilayer circuit board cut at the B-B cross section position of FIG. 15 according to Embodiment 5.

Similar to Embodiment 1, the breaking mechanism 30 is formed by the multilayer circuit board of six layers. FIG. 15 shows a plan view viewing the breaking mechanism 30 from the other side. Each fixing part is not shown. FIG. 16 shows a cross-sectional view cut at the A-A cross section position of FIG. 15, and FIG. 17 shows a cross-sectional view cut at the B-B cross section position of FIG. 15.

Similar to Embodiment 4, the breaking mechanism 30 supports the other side circuit board face of the multilayer circuit board, and is provided with an opposite side support member 53 fixed to the support member 50. The opposite side support member 53 overlaps with at least one part of the fuse part 35 which is the fusing part of the fuse pattern 31, viewing in the normal direction of the circuit board face of the multilayer circuit board.

However, unlike Embodiment 4, the opposite side support member 53 was fixed to the fixation projection part 46 together with the multilayer circuit board by the fixing part 51.

According to this configuration, it is not necessary to provide a dedicated fixing mechanism for fixing the opposite side support member 53 to the support member 50, and reduction of the manufacturing cost and the miniaturization can be achieved.

The opposite side support member 53 is thermally and electrically connected to the support member 50 via the fixing part 51 and the fixation projection part 46. Accordingly, the radiation effect and the breaking effect of the electromagnetic noise by the opposite side support member 53 can be increased.

In the present embodiment, the opposite side support member 53 is disposed on the other side of the multilayer circuit board. The screw 51 as the fixing part 51 penetrates the through hole 54 provided in the opposite side support member 53 and the through hole 45 of the multilayer circuit board, and is screwed in the screw hole 47 of the fixation projection part 46. The opposite side support member and the multilayer circuit board are fixed to the fixation projection part 46. According to this configuration, by screwing the screw 51 in the screw hole 47, the opposite side support member 53 can be easily pressed to the other side circuit board face of the multilayer circuit board. By managing the pressure torque of the screw 51, the pressing force between the opposite side support member 53 and the other side circuit board face of the multilayer circuit board and the pressing force between the support projection part 48 and the one side circuit board face of the multilayer circuit board can be managed at the same time. And, the exfoliation preventive effect of the multilayer circuit board at fusing can be made certain more.

The opposite side support member 53 is provided with a base part 53a which extended between the fixing part fixed to the first fixation projection part 46a and the fixing part fixed to the second fixation projection part 46b; and a support part 53b which extends from a central part of the base part 53a in extending direction Y to the fuse pattern 31 side, and overlaps with the central part of the fuse pattern 31, viewing in the normal direction of the circuit board face. The opposite side support member 53 is formed in T-shaped, viewing in the normal direction of the circuit board face.

Similar to Embodiment 4, an elastic member is interposed between the opposite side support member 53 and the other side circuit board face of the multilayer circuit board.

Other Embodiments

Figure 18:
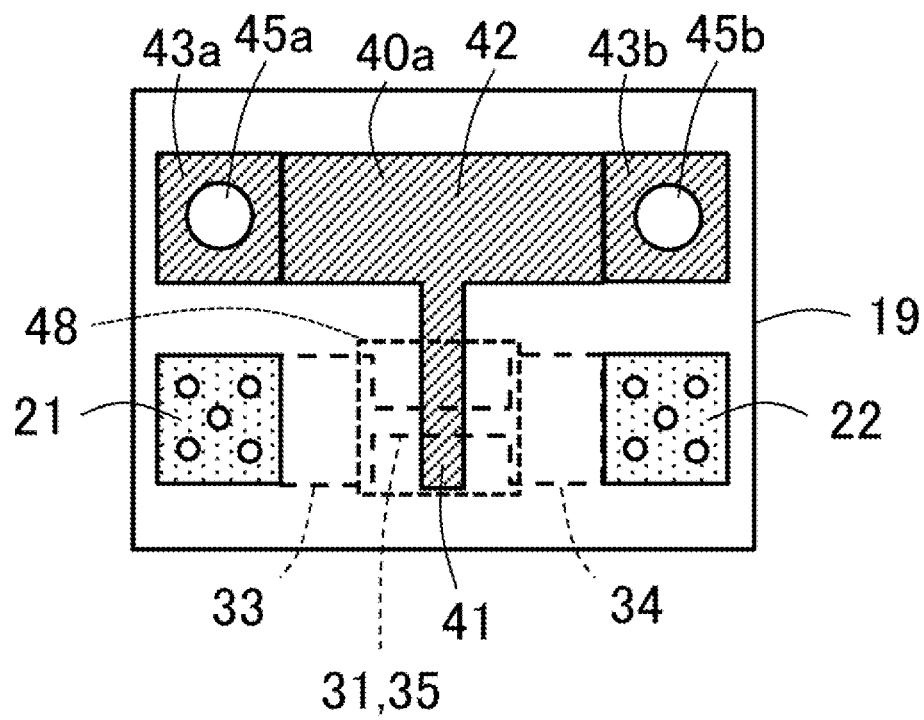
FIG. 18 is a cross-sectional view of the breaking mechanism according to other embodiments.
Figure 19A:
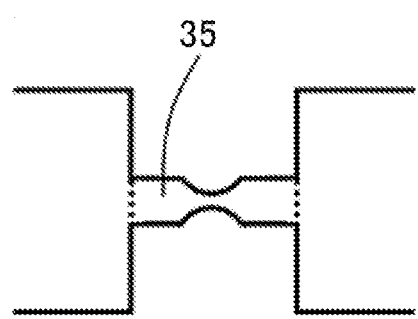
FIG. 19A to FIG. 19D are a plan view of the shape of the fuse part according to other embodiments.
Figure 19B:
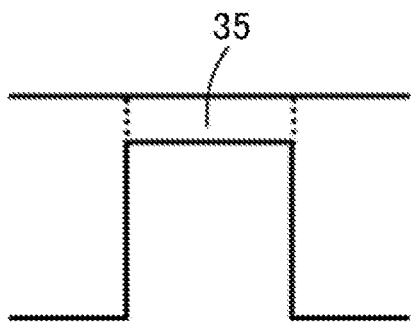
Figure 19C:
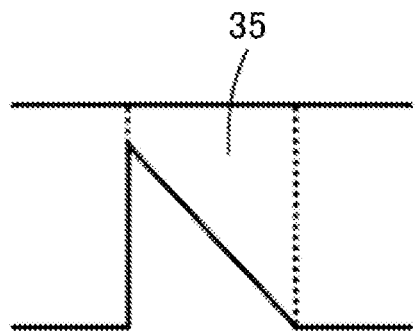
Figure 19D:
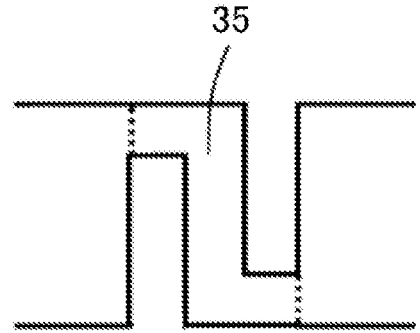

In each embodiment, the scattering prevention pattern 40 was provided so as to overlap with the whole fuse part 35, viewing in the normal direction of the circuit board face. However, as FIG. 18 shows other example of Embodiment 1, the scattering prevention pattern 40 may be provided so as to overlap with a part of fuse part 35, viewing in the normal direction of the circuit board face. If the certain scattering preventing effect of the fused material is obtained, any overlap degrees may be set.

In each embodiment, the fuse part 35 is formed of the rectangular plate shape. As long as the cross-section area of the fuse part 35 is smaller than other parts, it fuses when the short-circuit current flows, and the arc discharge can be broken, it may be any shape. For example, as shown in FIG. 19A to FIG. 19D, a notch may be provided on one side or the both sides of the plate-like pattern to reduce a cross-section area. The shape of notch may be any shape, such as a triangle, a pentagon, a trapezoid, a lozenge, a parallelogram, a circular, or an oval, other than a rectangle. A plurality of notches may be provided. A plurality of notches may be disposed alternately in zigzag or irregularly at different positions in the longitudinal directions of wiring.

In each embodiment, the breaking mechanism 30 is the fuse for breaking the excess current of the DC-DC converter. However, the breaking mechanism 30 may be provided in various kinds of circuits, as an arrester which breaks surge current other than steady excess current.

In each embodiment, the fuse pattern 31, the first terminal side base part 33, the second terminal side base part 34, the fuse part 35, the first terminal pattern 21, the second terminal pattern 22, each scattering prevention pattern 40, the connection pattern 43, the through hole 45 of the connection pattern 43, and the through holes 16 of the first and the second terminal patterns are made of copper. However, each of these conductive members may be formed of other conductive materials other than copper, such as silver (Ag), gold (Au), tin (Sn), aluminum (Al), nickel (Ni), or these alloys. Each of these conductive members may be formed of a single material, or may be formed of a plurality of different materials. The inner side of the through holes 16 of the first and the second terminal patterns may not be space, and may be filled with a conductive material or an insulating material.

In each embodiment, the breaking mechanism 30 is connected to the high potential side terminal 1H side of the first external connection terminal 1. However, the breaking mechanism 30 may be connected in series on the wiring member 25 which connects between the low potential side terminal 1L of the first external connection terminal 1, and the low voltage side of the semiconductor circuit 5. The breaking mechanism 30 may be connected to the high potential side terminal 2H side, or the low potential side terminal 2L side of the second external connection terminal 2. The breaking mechanism 30 may be connected in series to any parts on the circuit which can break excess current. A plurality of breaking mechanisms 30 may be provided.

In each embodiment, the power converter is the insulated type DC-DC converter. However, the power converter may be various kinds of power converters, such as a non-insulated DC-DC converter, an inverter, and a rectifier. The power converter may not be a step-down type converter which steps down voltage from the first external connection terminal 1 to the second external connection terminal 2. The power converter may be a step-up type converter which steps up voltage from the first external connection terminal 1 to the second external connection terminal 2. Alternatively, the voltage of the second external connection terminal 2 may be the same as the voltage of the first external connection terminal 1.

In each embodiment, the switching device was provided as the semiconductor element. However, the diode may be provided as the semiconductor element.

In each embodiment, the breaking mechanism 30 was provided in the power converter. However, the breaking mechanism 30 may be provided in various kinds of circuits other than the power converter. The breaking mechanism 30 may be distributed as a circuit component.

In each embodiment, the breaking mechanism 30 is formed by the multilayer circuit board. However, not only the breaking mechanism 30 but also other parts (for example, wiring member) of the power converter may be formed by the multilayer circuit board.

In each embodiment, the breaking mechanism 30 was formed by the multilayer circuit board of six layers. However, in Embodiment 1, the multilayer circuit board may be a multilayer circuit board of three or more layers which has at least one inner layer. For example, the multilayer circuit board may be a multilayer circuit board of three layers, the first scattering prevention pattern 40a may be provided in the first layer of the outer layer, the fuse pattern 31 may be provided in the second layer of the inner layer, and the second scattering prevention pattern 40b may be provided in the third layer of the outer layer. In Embodiment 2, the multilayer circuit board may be a multilayer circuit board of four or more layers which has at least three inner layers. As long as the fuse pattern 31 is provided in the inner layer, the first scattering prevention pattern 40a and the second scattering prevention pattern 40b may be provided in the outer layer or the inner layer, and any combination may be set.

In each embodiment, the two fixation projection parts 46 and the two fixing parts 51 were provided. However, any numbers of the fixation projection parts 46 and the fixing parts 51 may be provided. The fixation projection part 46 may be disposed also on the other side X2 of the lateral direction with respect to the fuse pattern 31.

In Embodiment 4, the two fixation projection parts for opposite side 49 and the two fixing parts for opposite side 57 were provided. However, any numbers of the fixation projection parts for opposite side 49 and the fixing parts for opposite side 57 may be provided. The fixation projection part for opposite side 49 may be disposed also on one side X1 of the lateral direction with respect to the fuse pattern 31.

In each embodiment, the multilayer circuit board was fixed to the fixation projection part 46 by the screw as the fixing part 51. However, as long as the multilayer circuit board is fixed to the fixation projection part 46, various kinds of fixing mechanisms may be used. For example, it may be fixed by caulking, welding, or a snap mechanism. FIG. 20 shows a cross-sectional view of an example of caulking. The fixation projection part 46 is provided with a columnar part 51 as the fixing part 51 projected to the multilayer circuit board side. The columnar part 51 penetrates the through hole 45 of the multilayer circuit board, the tip part of the columnar part 51 projected from the other side circuit board face of the multilayer circuit board is deformed by caulking and the like, and a deformed part presses the other side circuit board face (the end face of the through hole 45) of the multilayer circuit board. FIG. 21 shows a cross-sectional view of an example of welding. The fixation projection part 46 is provided with a columnar part 51 as the fixing part 51 projected to the multilayer circuit board side. The columnar part 51 penetrates the through hole 45 of the multilayer circuit board, and the tip part of the columnar part 51 projected from the other side circuit board face of the multilayer circuit board is welded to the other side circuit board face (the end face of the through hole 45) of the multilayer circuit board by a welding member 56, such as solder. Solder may be filled up between the through hole 45 and the columnar part 51. Alternatively, FIG. 22 shows a cross-sectional view of an example of the snap mechanism. The fixation projection part 46 is provided with a fitting hole 47 opened to the multilayer circuit board side. A snap rivet 51 as the fixing part 51 penetrates the through hole 45 of the multilayer circuit board, a snap part provided at the end of the snap rivet 51 is fitted into the fitting hole 47, and the multilayer circuit board is fixed to the fixation projection part 46. Alternatively, in FIG. 20, a snap part may be provided at the tip part of the columnar part 51. Similarly, other than the screw, various kinds of fixing mechanisms, such as caulking, welding, and a snap mechanism may be used also for the fixing part for opposite side 57.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:
1. A power converter comprising:
   a semiconductor element;
   a breaking mechanism that breaks current when excessive current flows; and a wiring member that connects the semiconductor element and the breaking mechanism, wherein the breaking mechanism is provided with
- a multilayer circuit board in which a plurality of conductive patterns including a fuse pattern which fuses when excessive current flows and a plurality of insulating members are laminated, and
- a support member which is provided with a support body part; a fixation projection part which projected from the support body part to the multilayer circuit board side and to which the multilayer circuit board was fixed; and a support projection part which projected from the support body part to the multilayer circuit board side and supports an one side circuit board face of the multilayer circuit board, wherein the fuse pattern is provided in an inner layer of the multilayer circuit board, and wherein the support projection part overlaps with at least one part of a fusing part of the fuse pattern, viewing in a normal direction of the circuit board face of the multilayer circuit board.

2. The power converter according to claim 1,
wherein the multilayer circuit board was fixed to the fixation projection part by a fixing part, and
wherein the one side circuit board face of the multilayer circuit board was pressed to the support projection part by a pressing force of the fixing part which presses the multilayer circuit board to the fixation projection part side.

3. The power converter according to claim 1,
wherein a projection height of the support projection part to the multilayer circuit board side is greater than or equal to a projection height of the fixation projection part to the multilayer circuit board side.

4. The power converter according to claim 1,
wherein the multilayer circuit board is provided with a conductive scattering prevention pattern in a layer different from a layer provided with the fuse pattern, and
wherein the scattering prevention pattern overlaps with at least one part of the fusing part of the fuse pattern, viewing in the normal direction of the circuit board face.

5. The power converter according to claim 4,
wherein the scattering prevention pattern is provided in an one side outer layer of the multilayer circuit board, and
wherein the support projection part supports an one side surface of the scattering prevention pattern.

6. The power converter according to claim 4,
wherein, the multilayer circuit board is provided with conductive connection patterns provided in respective layers at a position overlapping with each other when viewing in the normal direction of the circuit board face, and a tubular through hole which penetrates the connection patterns of respective layers and electrically conducts the connection patterns with each other,
wherein the scattering prevention pattern is connected with the connection pattern provided in the same layer as the scattering prevention pattern, and
wherein a fixing part which fixes the multilayer circuit board to the fixation projection part penetrates the through hole.

7. The power converter according to claim 6,
wherein the fixation projection part is provided with a screw hole opened to the multilayer circuit board side, a screw as the fixing part penetrates the through hole, and is screwed in the screw hole, and the multilayer circuit board was fixed to the fixation projection part.

8. The power converter according to claim 6,
wherein the support body part has a ground potential, and
wherein the scattering prevention pattern was connected to the support body part via the connection pattern, the through hole, the fixing part, and the fixation projection part, and has the ground potential.

9. The power converter according to claim 6,
wherein the first connection pattern and the second connection pattern are provided in each layer, the first through hole which penetrates the first connection patterns of respective layers and the second through hole which penetrates the second connection pattern of respective layers are provided, the first fixation projection part to which the first fixing part penetrating the first through hole was connected, and the second fixation projection part to which the second fixing part penetrating the second through hole was connected are provided, the first and the second connection patterns and the first and the second fixation projection parts are disposed on one side of a lateral direction which is orthogonal to an extending direction of the fuse pattern, with respect to the fuse pattern, viewing in the normal direction of the circuit board face, the first connection pattern and the first fixation projection part are disposed on one side of the extending direction than a central part of the fuse pattern in the extending direction, viewing in the normal direction of the circuit board face, the second connection pattern and the second fixation projection part are disposed on the other side of the extending direction than the central part of the fuse pattern, viewing in the normal direction of the circuit board face, the fusing part of the fuse pattern is provided in the central part of the fuse pattern, and the support projection part overlaps with the central part of the fuse pattern, viewing in the normal direction of the circuit board face.

10. The power converter according to claim 4,
wherein the plurality of scattering prevention patterns are provided in mutually different layers.

11. The power converter according to claim 10,
wherein a plurality of the scattering prevention patterns are provided at least in a layer on one side and a layer on the other side than a layer provided with the fuse pattern.

12. the power converter according to claim 4,
wherein the scattering prevention pattern is provided in an inner layer.

13. The power converter according to claim 1,
wherein the multilayer circuit board is formed by a printed circuit board.

14. The power converter according to claim 1,
wherein the fixation projection part and the support projection part are integrally formed with the support body part.

15. The power converter according to claim 1,
wherein an elastic member is interposed between the support projection part and the one side circuit board face of the multilayer circuit board.

16. The power converter according to claim 1, wherein the breaking mechanism supports the other side circuit board face of the multilayer circuit board, and is provided with an opposite side support member fixed to the support member, and the opposite side support member overlaps with at least one part of the fusing part of the fuse pattern, viewing in the normal direction of the circuit board face.

17. The power converter according to claim 16, wherein an elastic member is interposed between the opposite side support member and the other side circuit board face of the multilayer circuit board.

18. The power converter according to claim 16, wherein the support member is provided with a fixation projection part for opposite side which projected from the support body part to the multilayer circuit board side on a side of the multilayer circuit board, and to which the opposite side support member was fixed.

19. The power converter according to claim 18, wherein the support member is provided with the first fixation projection part for opposite side, and the second fixation projection part for opposite side, the fixation projection part is disposed on one side of the lateral direction which is orthogonal to an extending direction of the fuse pattern, with respect to the fuse pattern, viewing in the normal direction of the circuit board face, the first and the second fixation projection parts for opposite side are disposed on the other side of the lateral direction, with respect to the fuse pattern, viewing in the normal direction of the circuit board face, the first fixation projection part for opposite side is disposed on one side of the extending direction than a central part of the fuse pattern in the extending direction, viewing in the normal direction of the circuit board face, the second fixation projection part for opposite side is disposed on the other side of the extending direction than the central part of the fuse pattern, viewing in the normal direction of the circuit board face, the fusing part of the fuse pattern is provided in the central part of the fuse pattern, and the opposite side support member is provided with a base part which extended between a fixed part fixed to the first fixation projection part for opposite side and a fixed part fixed to the second fixation projection part for opposite side, and a support part which extends from a central part of the base part to the fuse pattern side, and overlaps with the central part of the fuse pattern, viewing in the normal direction of the circuit board face.

20. The power converter according to claim 16, wherein the opposite side support member was fixed to the fixation projection part together with the multilayer circuit board by the fixing part.

21. The power converter according to claim 1, wherein a voltage supplied to the breaking mechanism is a DC voltage greater than or equal to 20V.

22. A breaking mechanism that breaks current when excessive current flows, the breaking mechanism comprising:

a multilayer circuit board in which a plurality of conductive patterns including a fuse pattern which fuses when excessive current flows and a plurality of insulating members are laminated, and a supporting member which is provided with a support body part; a fixation projection part which projected from the support body part to the multilayer circuit board side and to which the multilayer circuit board was fixed; and a support projection part which projected from the support body part to the multilayer circuit board side and supports an one side circuit board face of the multilayer circuit board, wherein the fuse pattern is provided in an inner layer of the multilayer circuit board, and wherein the support projection part overlaps with at least one part of a fusing part of the fuse pattern, viewing in a normal direction of the circuit board face of the multilayer circuit board.

\* \* \* \* \*